United States Patent [19]
Nitta

[11] Patent Number: 5,530,901
[45] Date of Patent: Jun. 25, 1996

[54] DATA TRANSMISSION PROCESSING SYSTEM HAVING DMA CHANNELS RUNNING CYCLICALLY TO EXECUTE DATA TRANSMISSION FROM HOST TO MEMORY AND FROM MEMORY TO PROCESSING UNIT SUCCESSIVELY

[75] Inventor: Hiroshi Nitta, Atsugi, Japan

[73] Assignee: Ricoh Company, Ltd., Tokyo, Japan

[21] Appl. No.: 981,106

[22] Filed: Nov. 24, 1992

[30] Foreign Application Priority Data

Nov. 28, 1991 [JP] Japan ................................. 3-314379
Jun. 18, 1992 [JP] Japan ................................. 4-158404

[51] Int. Cl.$^6$ .......................... G06F 13/12; G06F 13/14
[52] U.S. Cl. .................. 395/848; 395/842; 395/858; 395/864; 395/8; 395/72; 364/242.31; 364/242.32; 364/242.33; 364/DIG. 1
[58] Field of Search ............................ 395/275, 848, 395/842, 858, 864, 872; 346/1.1

[56] References Cited

U.S. PATENT DOCUMENTS

| | | | |
|---|---|---|---|
| 4,017,839 | 4/1977 | Calle et al. | 340/172.5 |
| 4,067,059 | 1/1978 | Derchak | 364/200 |
| 4,688,166 | 8/1987 | Schneider | 364/200 |
| 4,750,107 | 6/1988 | Buggert | 364/200 |
| 4,831,523 | 5/1989 | Lewis et al. | 364/200 |
| 4,933,686 | 6/1990 | Izumi et al. | 346/1.1 |

FOREIGN PATENT DOCUMENTS 3810231  10/1988  Germany.

Primary Examiner—Thomas C. Lee
Assistant Examiner—Le Hien Luu
Attorney, Agent, or Firm—Oblon, Spivak, McClelland, Maier & Neustadt

[57] ABSTRACT

A data transmission processing system provided between a host unit and peripheral devices including at least a memory device and a processing device. The host unit outputs, to the transmission processing system, DMA transmission process request commands. The data transmission process system includes a DMA control unit, provided with a plurality of DMA channels, for cyclically selecting a DMA channel from the plurality of DMA channels in accordance with a predetermined priority, the plurality of DMA channels being allocated to processes with respect to the peripheral devices, and a DMA execution unit for carrying out a DMA transmission process for transmitting data output from the host unit to the memory device via a selected DMA channel corresponding to the memory device in data transmission timing of the host unit and a DMA transmission process for transmitting data stored in the memory device to the processing device via a selected DMA channel corresponding to the processing device in accordance with the DMA transmission process request commands supplied from the host unit.

9 Claims, 30 Drawing Sheets

| MUX ADRESS | MA9 | MA8 | MA7 | MA6 | MA5 | MA4 | MA3 | MA2 | MA1 | MA0 |
|---|---|---|---|---|---|---|---|---|---|---|
| ROW ADRESS | A18 | A16 | A14 | A12 | A10 | A8 | A6 | A4 | A2 | A0 |
| CLM ADRESS | A19 | A17 | A15 | A13 | A11 | A9 | A7 | A5 | A3 | A1 |

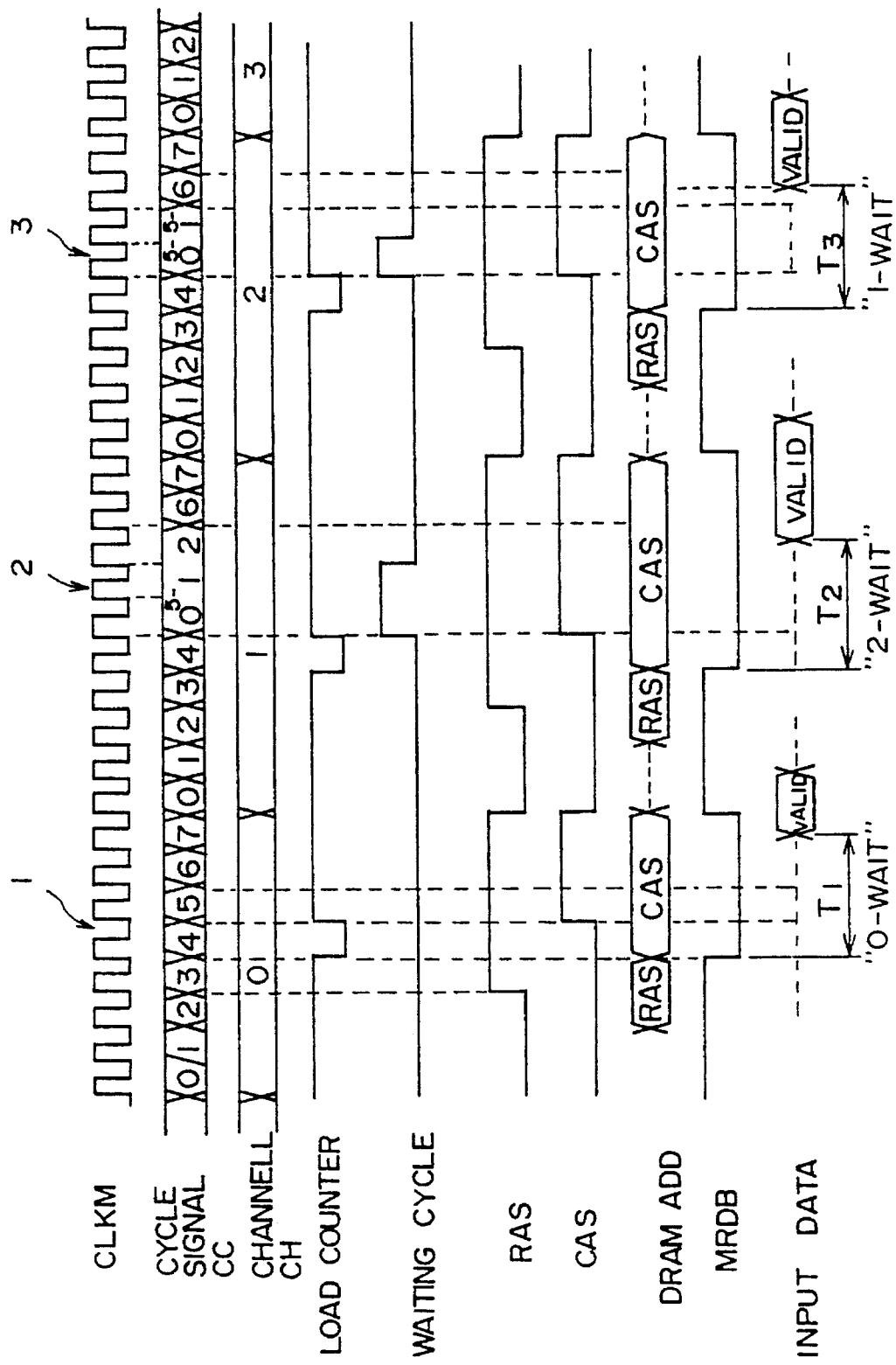

DATA TRANSMISSION PROCESSING SYSTEM HAVING DMA CHANNELS RUNNING CYCLICALLY TO EXECUTE DATA TRANSMISSION FROM HOST TO MEMORY AND FROM MEMORY TO PROCESSING UNIT SUCCESSIVELY

BACKGROUND OF THE INVENTION (1) Field of the Invention

The present invention generally relates to a data transmission processing system, and more particularly to a data transmission processing system for executing a data transmission process in a DMA (Direct Memory Access) transmission mode between a host unit and peripheral device.

(2) Description of Related Art

In facsimile machines, for example, a host unit 11 and a laser printer 1 are coupled to each other via a hand-shake logic (hereinafter HSL) unit 2 as shown in FIG. 1. The laser printer 1 is provided with a slave CPU (Central Processing Unit) 3 and a PROM (Programable Read Only Memory) 4 that are used for the data transmission process in the DMA transmission mode, as shown in FIG. 2. The PROM 4 stores a DMA processing program for the DMA transmission mode. The CPU 3 controls the data transmission process in the DMA transmission mode in accordance with the DMA processing program stored in the PROM 4. The printer 1 is also provided with a page memory 5 formed of a DRAM (Dynamic Random Access Memory), a laser diode synchronous unit (hereinafter referred to as an LDS unit) 6, an SRAM (Static Random Access Memory) 7 and a laser driver 8 for driving a laser diode 9.

Image data supplied from the host unit 11 via the HSL unit 2 is transmitted to the page memory 5 in the DMA transmission mode. The image data is further transmitted from the page memory 5 to the LDS unit 6 in the DMA transmission mode. The SRAM 7 modifies addresses of image data to perform a smoothing process for the image data. The LDS unit 6 supplies the image data processed by the SRAM 7 to the laser driver 8 in synchronism with the operation of the laser driver. The laser driver 8 drives the laser diode 9 based on the image data supplied from the LDS unit 6 during a predetermined scanning time. A laser beam emitted from the laser diode 9 driven by the laser driver 8 is projected onto a photosensitive drum, so that an electrostatic latent image corresponding to the image data is formed on the photosensitive drum. A detector unit 10 detects an end position of one scanned line of the laser beam and outputs a LNSYNC signal representing one scanning line. The LNSYNC signal is supplied from the detector unit 10 to the laser driver 8.

In the data transmission process in the DMA transmission mode controlled by the slave CPU 3, the image data read by a scanner in the host unit 11 line by line is transmitted to the laser printer 1 via the HSL unit 2, and is stored in the page memory 5 line by line while an address is being incremented one by one from a starting address. In a case where image data is transmitted from the page memory 5 to the LDS unit 6 in the DMA transmission mode, image data of pixels within a matrix lying over a plurality of lines, the matrix comprising an attentional pixel and peripheral pixels surrounding the attentional pixel, is transmitted from the page memory 5 to the LDS 6 in the DMA transmission mode by a single process.

According to the width of a document (e.g. A4 size, B4 size or the like) read by scanner in the host unit 11, the length of each address area for one line is changed in the page memory 5. As the image data of pixels in the matrix, which matrix lies over a plurality of the lines, is transmitted from the page memory 5 to the LDS unit 6 in the DMA transmission mode by a single process, read addresses of the image data of pixels in the matrix are skipped. The image data of the pixels is temporally stored in the SRAM 7 so that the skipped addresses of the image data of the pixels in the matrix are modified, and the image data of pixels is then supplied to the laser driver 8.

In the above conventional data transmission system provided in the laser printer 1 in which system the smoothing process for the image data is performed, the SRAM 7 is needed to modify addresses of image data of pixels in the matrix. As a result, the control of the data transmission in the DMA transmission mode between the page memory 5 and the LDS unit 6 is complex. In addition, the slave CPU 3 and the PROM 4 are needed for performing the data transmission process in the DMA transmission mode. Thus, the number of parts in a circuit for the data transmission process in the DMA transmission mode is large, so that a high cost is required to producet the laser printer 1.

SUMMARY OF THE INVENTION

Accordingly, a general object of the present invention is to provide a novel and useful data transmission processing system in which the disadvantages of the aforementioned prior art are eliminated.

A more specific object of the present invention is to provide a data transmission processing unit in which the data transmission process in the DMA transmission mode can be performed without the slave CPU and the PROM 4.

Another object of the present invention is to provide a data transmission processing system in which an image processing for the image data, such as the smoothing process, can be performed without the SRAM 7 while the image data is transmitted from the page memory to another unit in the DMA transmission mode.

The above objects of the present invention are achieved by a data transmission system provided between a host unit and peripheral devices including at least a memory device for storing data supplied from said host unit and a processing device for processing the data stored in said memory unit in accordance with a predetermined algorithm, said host unit outputting, to said transmission processing system, DMA transmission process request commands for requesting DMA (Direct Memory Access) transmission processes in which data is transmitted to said peripheral devices in a DMA transmission mode, said data transmission process system comprising: DMA control means, provided with a plurality of DMA channels, for cyclically selecting a DMA channel from said plurality of DMA channels in accordance with a predetermined priority, said plurality of DMA channels being allocated to processes with respect to said peripheral devices; and DMA execution means, coupled to said DMA control means, for carrying out a DMA transmission process for transmitting data output from said host unit to said memory device via a selected DMA channel corresponding to said memory device in data transmission timing of said host unit and a DMA transmission process for transmitting data stored in said memory device to said processing device via a selected DMA channel corresponding to said processing device in accordance with the DMA transmission process request commands supplied from said host unit, so that the DMA transmission processes in which the data transmitted from said host unit to said memory device and from said memory device to said processing unit are successively carried out.

According to the present invention, the data can successively tranmitted from the host unit to the memory device and from the host unit to the processing device via the DMA channels corresponding to the memory device and the processing device without the slave CPU for controlling the DMA transmission process ana the SRAM for changing the addressing of the data to be transmitted from the memory device to the processing device.

Additional objects, features and advantages of the present invention will become apparent from the following detailed description when read in conjunction with the accompanying drawings.

BRIEF DESCRIPTION OF THE DRAWINGS

FIG. 33 is a timing chart illustrating oparations of the data transmission processing system shown in FIG. 32.

DESCRIPTION OF THE PREFERRED EMBODIMENTS

A description will now be given of an embodiment of the present invention.

In this embodiment, a data transmission process in the DMA transmission mode (hereinafter referred to as a DMA transmission process) is performed in a laser printer unit under the following conditions.

There are eight channels (CH0 through CH7) in the DMA transmission mode. The laser printer can make prints in three printing modes STD, DTL and SSF. In the standard printing mode STD, the line printing rate is 8×3.85 lines/mm, in the detailed printing mode DTL, the line printing rate is 8×7.7 lines/mm, and in the stiffness printing mode SSF, the line printing rate is 8×15.4 lines/mm. The size of a window used for the smoothing process corresponds to a 3×4 matrix, the size of each dot in the matrix corresponding to the size of a dot printed in the standard printing mode STD (8×3.5 lines/mm). The size of each pixel to which the smoothing process is applied (that is, the size of each printed dot) corresponds to the line printing ratio of 8×15.4 lines/mm. In this embodiment, the seventh channel CH7 is determined as a spare channel so that the seventh channel CH7 is provided with no function.

The image information stored in a memory is processed line by line. One line of the image information does not always correspond to one scanning performed by an optical writing unit comprising a rotated polygonal mirror. Thus, in this embodiment, "one line" of the image information is distinguished from "one scanning". For example, the image information is transmitted from the host unit to the page memory line by line, and the image information is transmitted from the page memory to the scanning timing controller scan by scan. In the laser printer, the laser beam emitted from the laser diode (LD) is deflected by the rotated polygonal mirror, and the laser beam scans the surface of a photosensitive medium so that an optical writing process is carried out.

Figure 3:
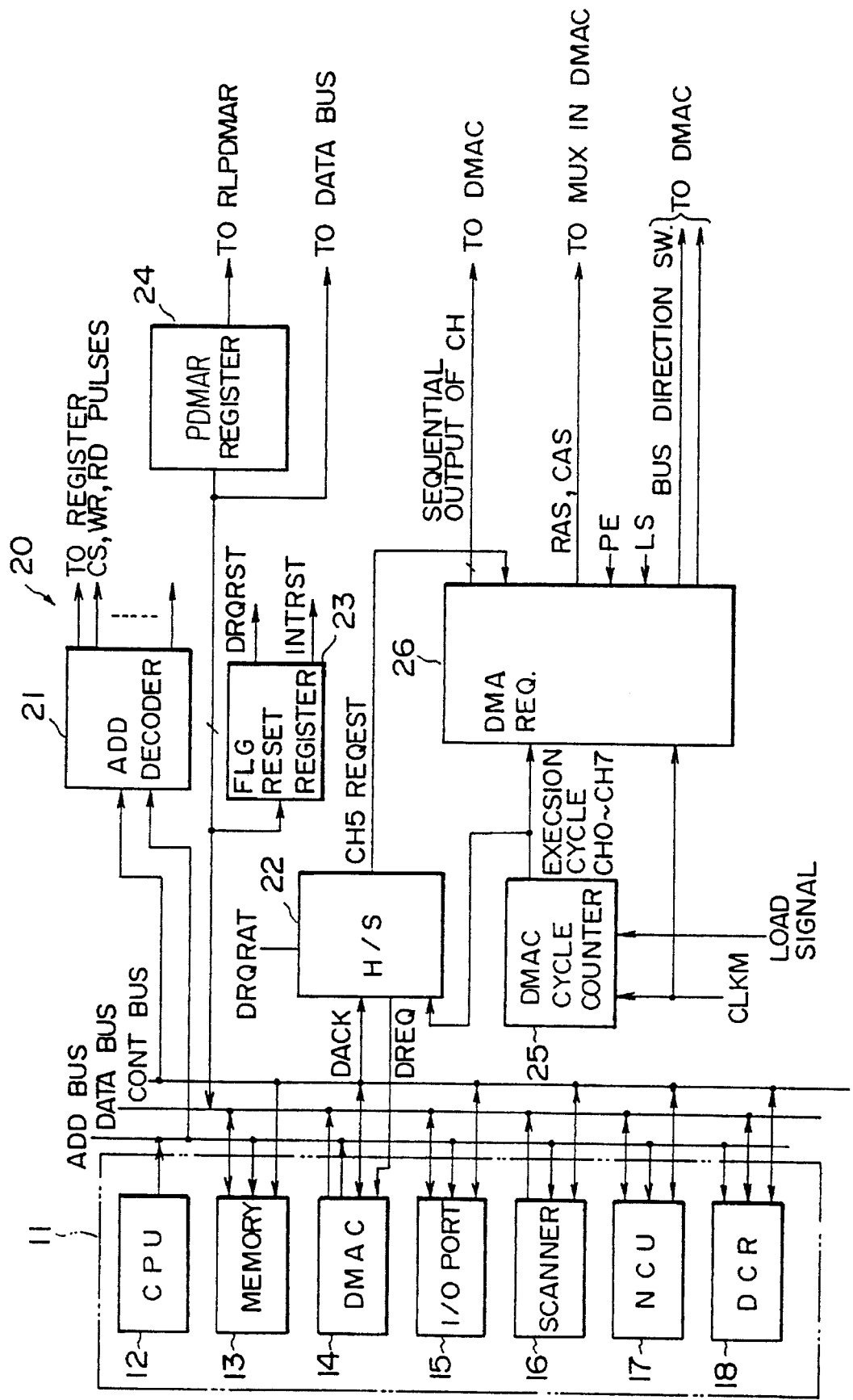
FIG. 3 is a block diagram illustrating an HIF unit provided in a laser printer to which a data transmission processing system according to the present invention is applied.
Figure 4:
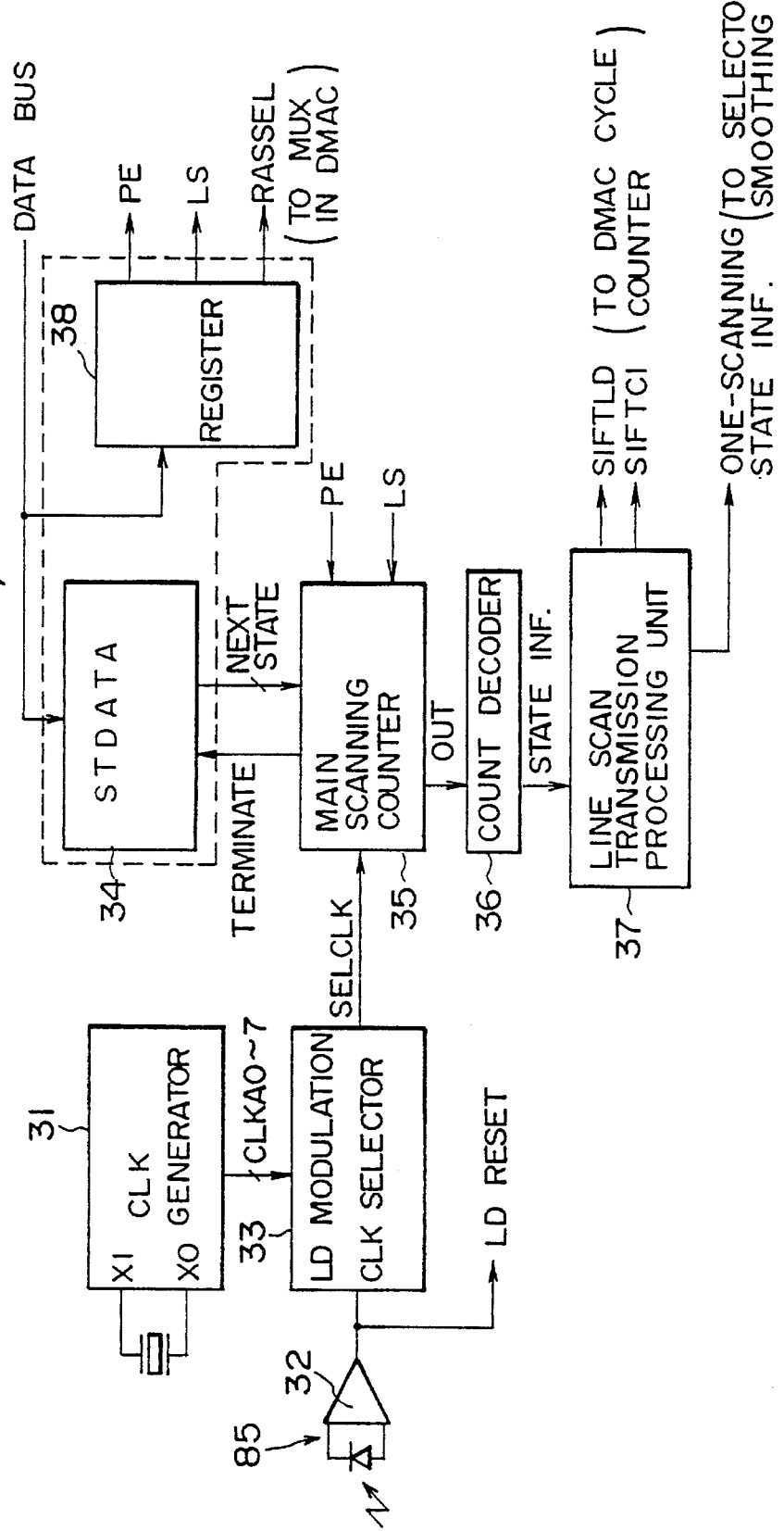
FIG. 4 is a block diagram illustrating an LDS unit provided in the laser printer to which the data transmission processing system according to the present invention is applied.
Figure 5:
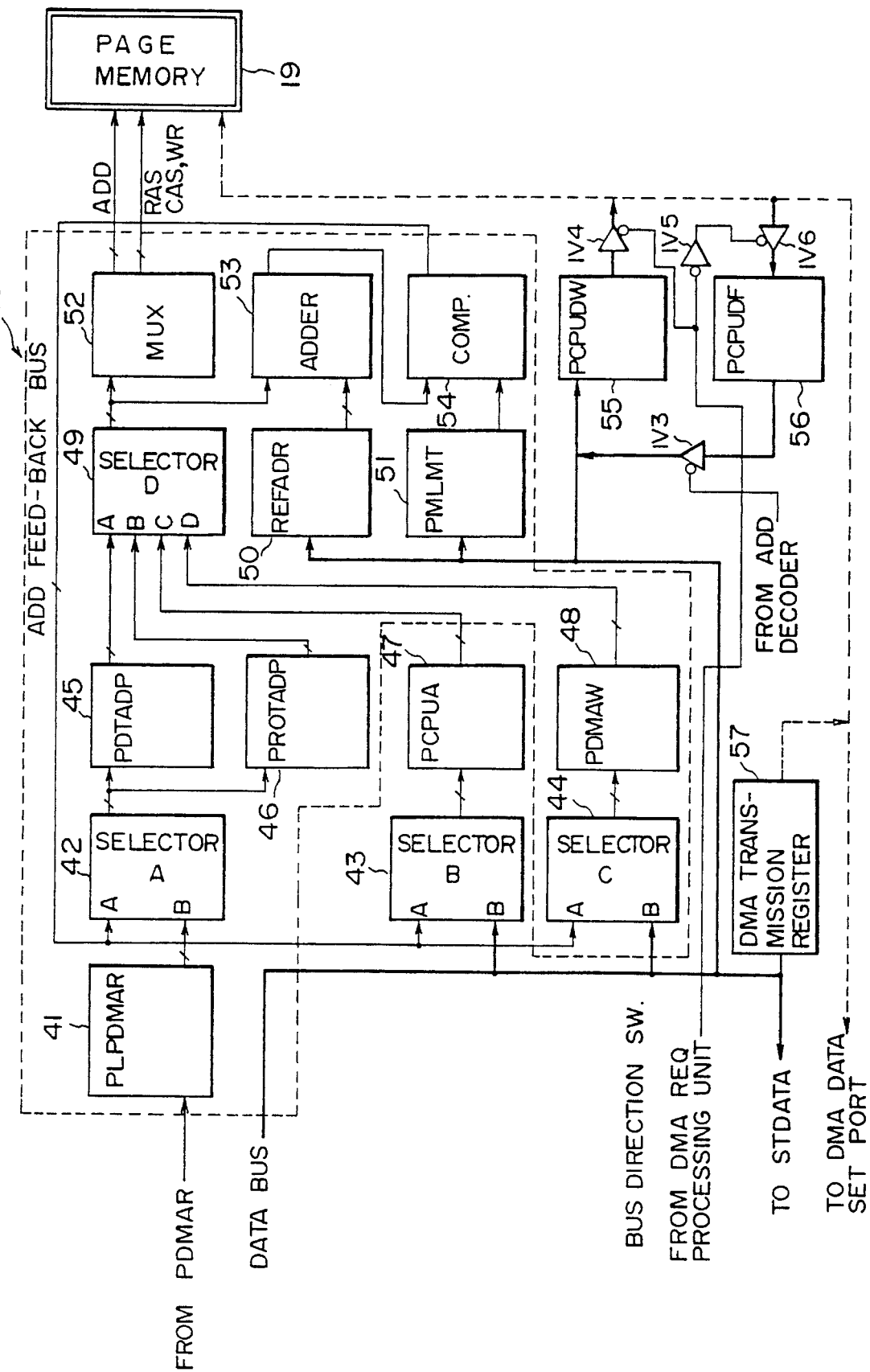
FIG. 5 is a block diagram illustrating a DMAC unit provided in the laser printer to which the data transmission processing system according to the present invention is applied.
Figure 6:
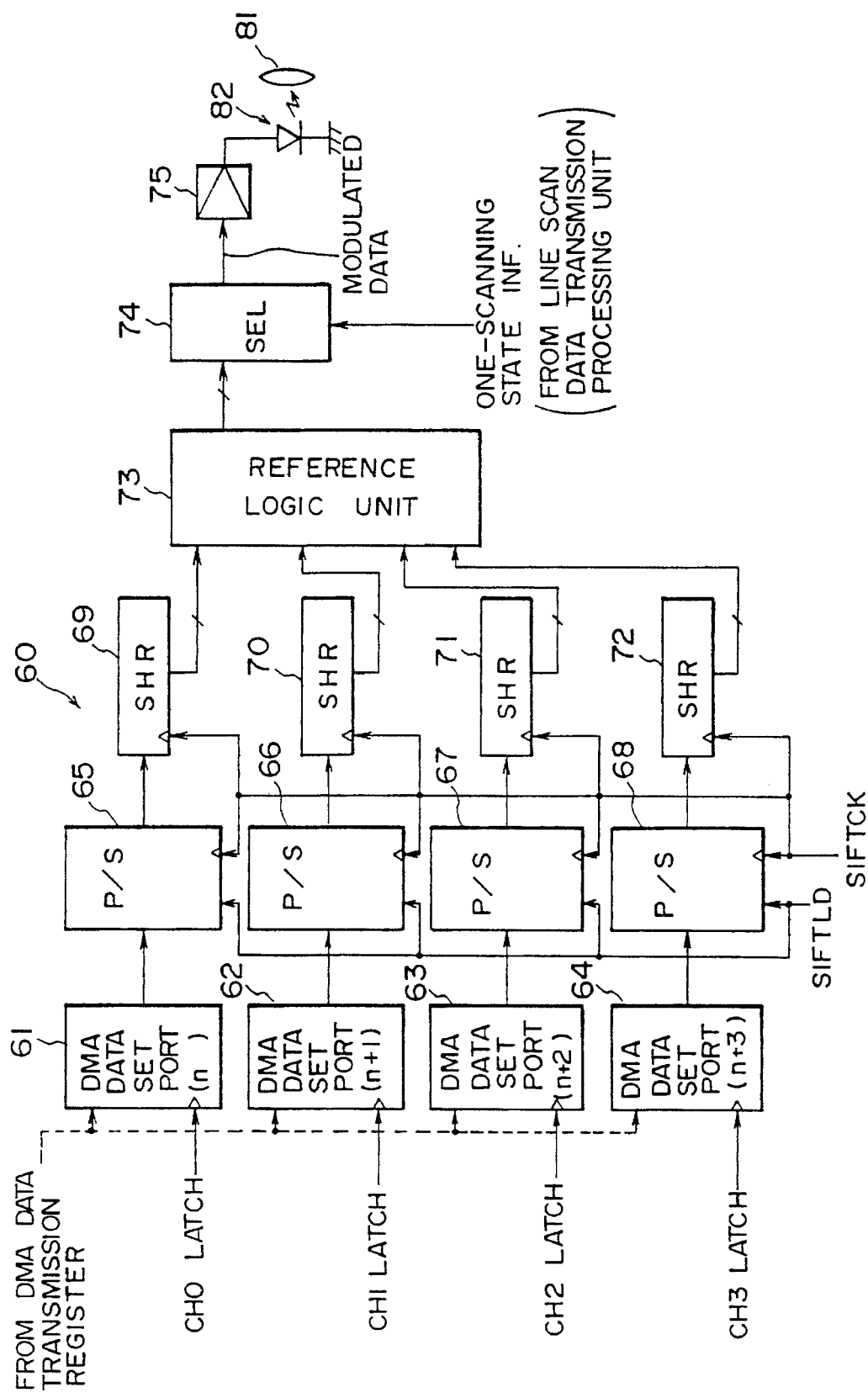
FIG. 6 is a block diagram illustrating a smoothing processing unit provided in the laser printer to which the data transmission processing system according to the present invention is applied.

FIGS. 3 through 6 show essential characteristics of the laser printer. FIG. 3 shows a host interface unit (hereinafter referred to as a HIF unit) 20 for controlling data transmission via buses between it and the host unit. FIG. 4 shows a clock generation unit 31 for generating a master clock signal and a shift clock signal used for timing control of various parts of the laser printer. FIG. 4 also shows an LDS (Laser diode synchronous) unit 30 for controlling output timing of image data to the laser driver. FIG. 5 shows DMAC unit 40 for controlling the DMA transmission processes for transmitting image data from the host unit 11 to a page memory and from the page memory to a smoothing processing unit 60. FIG. 6 shows the smoothing processing unit 60 for carrying out a smoothing process of image data transmitted from the page memory in the DMA transmission mode.

Referring to FIG. 3, the host unit 11 corresponds to a facsimile, and comprises a CPU 12, a memory 13, a DMA controller (DMAC) 14, an input/output port 15, a scanner 16, a network control unit (NCU) 17 and a coder/decoder 18. The host unit 11 and the HIF unit 20 are coupled to each other via an address bus, a data bus and a control bus. The data bus of the CPU 12 has 8-bits, and an address space of the CPU 12 can be expanded by a bank switching operation. The memory 13 is used for storing image information. The DMA controller 14 controls the data transmission via the data bus in the DMA transmission mode.

The HIF 20 has an address decoder 21, a hand-shake logic 22, a flag reset register 23, a PDMAR register 24, a DMAC cycle counter 25 and a DMA request processing unit 26. The HIF 20 controls transmission/receipt processes of command information, status information, interrupt information and image information to/from the the host unit 11. The image information is transmitted to the page memory 19 shown in FIG. 5 via a DMA channel of the DMAC unit 40 shown in FIG. 5 by the DMA controller 14 of the host unit 11.

The address decoder 21 outputs a chip select signal (CS) and a write signal (WR) to respective registers in the DMAC unit 40 based on address data and command signals supplied from the host unit 11. The hand-shake logic 22 carries out data transmission/receipt processes of the image data transmitted through a DMA channel CH5 (to be describer later) to/from the host unit 11. When the host unit 11 finishes the DMA transmission process for one line of image data or for one page thereof, the flag reset register 23 outputs a DRQRST (DMA CPU-PM Line End DREQ Reset) signal to compulsorily reset the data reset signal DREQ. Thus, the data request signal DREQ for the next image data is always activated, independently of the number of DMA transmission processes having taking place between the host unit 11 and the page memory 19. When a process for setting image data for one line is completed and the set image data for one line starts to be output (printed), the process for setting image data for the next line can be carried out. AT this time, the flag reset register outputs an INTRST (DMA PM-LDS Line End Interrupt Reset) signal for resetting an interrupt signal indicating the request of the process for the next line. The PDMAR (Page Memory DMA read address) register 24 sets a start address of image data to be transmitted from the page memory 19 to a LDS (Laser Diode Synchronous) unit 30 (to be described later). The DMAC cycle counter 25 carries out management of the DMA cycle based on the master clock signal CLKM supplied from a clock generator 31 shown in FIG. 4 and a load signal supplied from a line scan data transmission processing unit 37. The DMAC cycle counter 25 is formed of an octal counter that can be reset to a predetermined value. The DMAC cycle counter 25 outputs a value indicating an operation state of DMA channel so that image data is read out from the page memory 19 in synchronism with line by line writing operations. The DMA request processing unit 26 outputs various strobe signals used for the DMA transmission process and bus switching signals for selecting transmission directions of data. The data request signal (DREQ of a channel is set based on a channel operation request, and then when a count value reaches a value at which the channel starts to operate, a channel operation state signal is asserted in the DMA request processing unit 26. When the channel operation is finished, the channel operation state signal is gated. The strobe signal having a period equal to one sixty-fourth (1/64) of the period of the master clock signal generated by the clock generator 31 is gated based on the channel operation state signal. Inverters IV3–IV6 in the DMAC unit 40 are controlled by the bus switching signals output from the DMA request processing unit 26 or by control signals supplied from the CPU 12 of the host unit 11, so that a direction in which the image data is output to the data bus in the DMAC unit 40 is switched.

Referring to FIG. 4 showing the LDS unit 30, the LDS unit 30 has the clock generator 31, a detector 32 for detecting an end position of one scanned line of the laser beam, an LD modulation clock selecting unit 33, a STDATA register 34, a main scanning counter 35, a count decoder 36, a data transmission processing unit 37 and a register 38 for setting a control command mode. The LDS 30 controls output timing of image data line by line so as to be in synchronism with an optical scanning operation by a polygonal mirror. The LDS 30 carries out a parallel-to-serial conversion (hereinafter referred to as a P/S conversion) of a ata sequence corresponding to the image information, sets a start point at which a printing starts, sets a length of each line (the number of pixels in each line) and carries out a synchronous detecting process.

In this embodiment, the laser printer has the polygonal mirror for deflecting the laser beam. The laser beam compulsorily emitted from the laser diode is deflected by the rotating polygonal mirror. The laser beam is detected by a photodetector provided at a point on a scanning line, the point being located before a starting point at which the printing starts, on a scanning line. The photodetector outputs a synchronous signal every time it detects the laser beam. The synchronous signal is output from the photodetector in asynchronous with the DMA transmission operation. Thus, a modulation clock signal is selected whose phase is closest to a phase of the synchronous signal output from the photodetector; the selection being made among from clock signals whose phases slightly differ from each other. The timing control of scanning on each line is carried out based on the selected modulation clock signal in the LDS unit 30.

The frequency of the synchronous signal corresponds to a period of the DMA transmission cycle. However, the phase of the synchronous signal differs from the phase of the DMA transmission cycle. Thus, the LDS unit 30 compulsorily changes a priority of operations of the DMA channel so that the read channel of the DMA is operated in synchronism with a timing for output start of the serial data.

The clock generator 31 generates the master clock signal used for internal circuits in the laser printer and used as the LD (Laser Diode) modulation timing signal. The period of the master clock signal is determined based on a time required to scan a minimum size pixel. The period of the master clock corresponds, for example, a time required to scan by 1/16 mm corresponding to one pixel on the photosensitive drum. A clock signal to be used for scanning is made based on the master clock signal. Thus, the clock signal to be used for scanning is selected from a plurality of clock signals CLKA0–7 whose phases differ from each other in a manner so as to make the range of fluctuation of scanning positions be a minimum. In this embodiment, the clock generator 31 generates the clock signals whose phases differ from each other by π/4 radians. The clock signals CLKA0–7 are used as shift clocks whose periods differ from one to another by one eighth (1/8). The period of the master clock signal is four times as large as the period of each of the shift clocks. The frequency of the operation clock signal for the DMA transmission process, which period corresponds to an operation in each of the DMA channels, is one eighth (1/8) of the frequency of the master clock signal. In this embodiment, one DMA cycle is carried out for a period of 1/64 of that of the master clock. Accessing to the page memory 19 and peripheral logic circuits is carried out channel by channel. The strobe signals used for the accessing are made based on the master clock signal.

The detector 32 detects the laser beam emitted from the laser diode and deflected by the polygonal mirror. The detector 32 outputs the LNSYNC signal every time it detects the laser beam. The LD modulation clock selecting unit 33 selects a clock signal which is activated first after the LNSYNC signal is supplied from the detector 32, as a selected clock signal SELCLK, from the eight clock signals CLKA0–7 output from the clock generator 31.

The STDATA register 34 includes registers for programmably setting state values corresponding to various conditions, such as a type of electrophotographic process, the structure of the printer, the printing size and an image line density.

State information representing states regarding the scanning process, such as a state where either outside or inside of the photosensitive member is scanned, a state where a data area is scanned and a state where the laser emission for the next line is prepared, is generated based on the state value set in the registers of the STDATA register 34. Addresses identifying the registers of the STDATA register 34 may differ from each other. The registers are successively accessed. Thus, all the registers of the STDATA register 34 may also correspond to the same address. In a case where all the registers corresponds to the same address, a state counter is used for managing the state information. The state counter increments every time the state value is set in each register. An IP bit for representing whether or not the smoothing process is to be carried out by the use of an interpolation technique, a negative/positive bit for representing whether the laser diode is activated or inactivated at black dot image data and the like are all included with information defining operations of the laser printer.

In a case where the STDATA register 34 is identified by one address, bits used for monitoring address information of the registers of the STDATA register 34 are included in the state information of the LDS unit 30. Even if state values are erroneously set in the registers, the state values can be corrected with reference to the monitored bits. The DMAC unit 40 carries out the DMA transmission process in the DMA channel. A monitor bit indicating whether or not a read/write operation in the DMA transmission process is completed is also stored in the STDATA register 34. The CPU 12 of the host unit 11 accesses the page memory 19 by use of an indirect addressing technique with monitoring the above monitor bit set in the STDATA register 34.

The main scanning counter 35 carries out a counting operation of the state value set in the STDATA register 34 in synchronism with the shift clock signal selected by the LD modulation clock selector 33, and outputs the count value and a termination signal. When the count value reaches a value corresponding to the last state and the synchronous signal is input to the main scanning counter 35, a first state value of the next line is supplied to the main scanning counter 35 and the counting operation is carried out again. The count decoder 36 decodes the count value supplied from the main scanning counter 35.

A line scan data transmission processing unit 37 controls the DMA addresses and various corresponding timings when image data is transmitted from the page memory 19 to the LDS unit 30 via the DMA channels CH0–CH3. The line scan data transmission processing unit 37 also controls buffering operations (in a DMA data set port, a second latch and P/S registers) between the page memory 19 and the smoothing processing unit 60. The line scan data transmission processing unit 37 outputs a SIFTCK signal and a SFTLD signal. The SIFTCK signal is a control signal used for controlling output timings of serial data of the P/S registers in the smoothing processing unit 60. The SFTLD signal is a control signal used for controlling data load timing. Further, in the line scan data transmission processing unit 37, when a line start command (LS) is output from the register 38 and the scanning has started, it is determined, in accordance with modes or with print size instruction, at what timings the scanning has been performed and whether or not the first image line has been formed.

Figure 7:
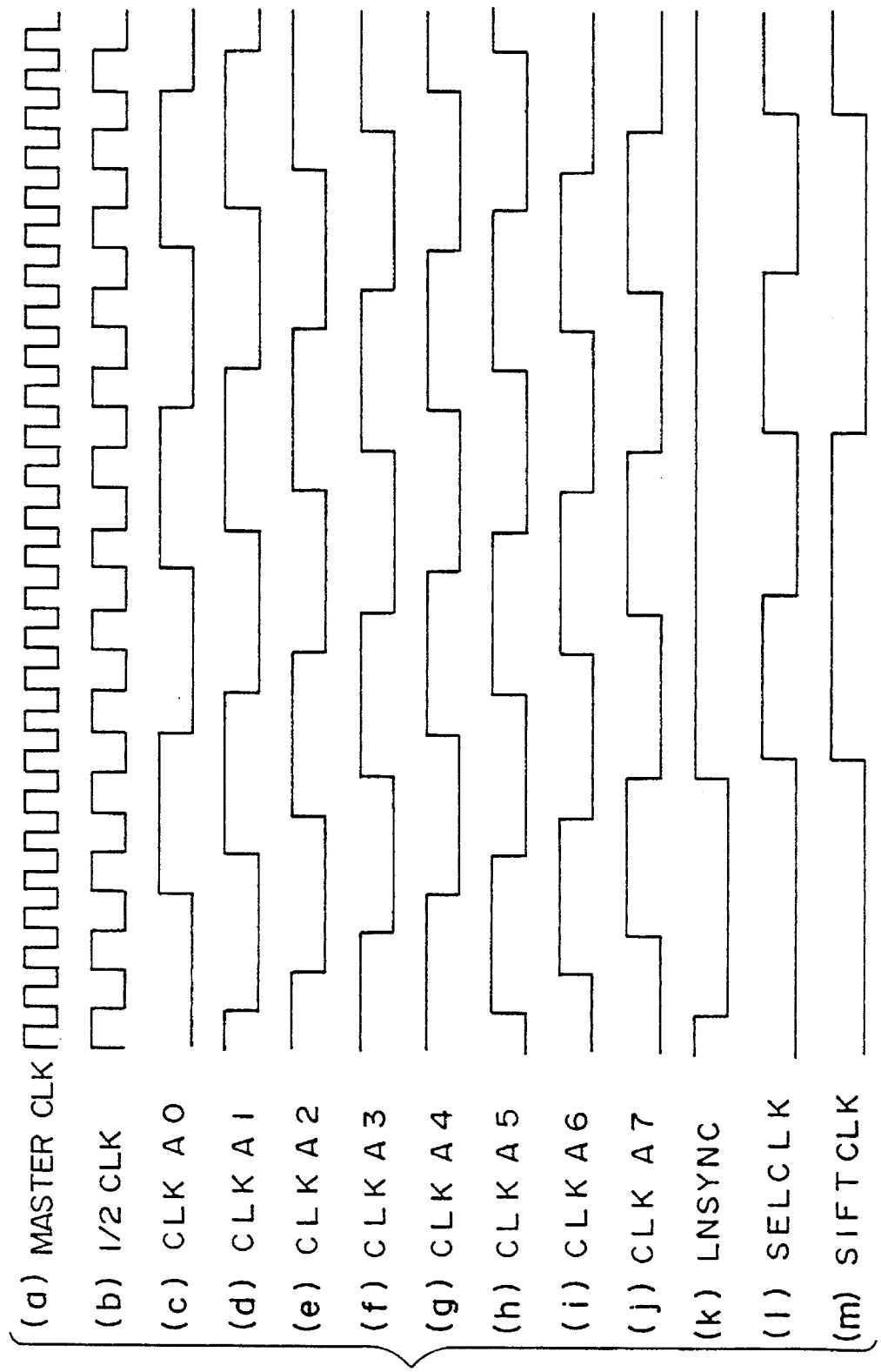
FIG. 7 is a timing chart illustrating various signals output from a clock generator shown in FIG. 4.

The clock signals CLK0–7, the LNSYNC signal and the shift clock SFTCLK and so on are varied in accordance with a timing chart as shown in FIG. 7.

The register 38 comprises a control command register and a mode set register. The control command register outputs a page-print enable (PE) signal used for initializing an internal counter of the LDS unit 30 and representing a state where the printing is enabled, a raster command used for starting printing for each image line (including four scanning processes in the STD mode, two scanning processes in the DTL mode and one scanning process in the SSF mode) and a reset (RST) command used for initializing internal states. The mode set register stores information including bits used for switching the image line density (in the STD, DTL and SSF modes) and bits indicating a reducing operation. The mode set register also outputs a RASSEL signal used for switching an output timing of a RAS signal (for setting an address in the page memory in a row direction) when a capacity of the DRAM forming the page memory 19 is changed.

Referring to FIG. 5, the DMAC unit 40 comprises a PLDMAR register 41, a selector(A) 42, a selector(B) 43, a selector(C) 44, A PDTADP register 45, a PRDTADP register 46, a PCPUA register 47, a PDMAW register 48, a selector(D) 49, a REFADR register 50, PMLMT register 51, a multiplexer 52, a full-bit adder unit 53, a page memory area converter 54, a PCPUDW data set register 55, a PCPUDR register 56 and a DMA data transmission register 57.

Figure 1:
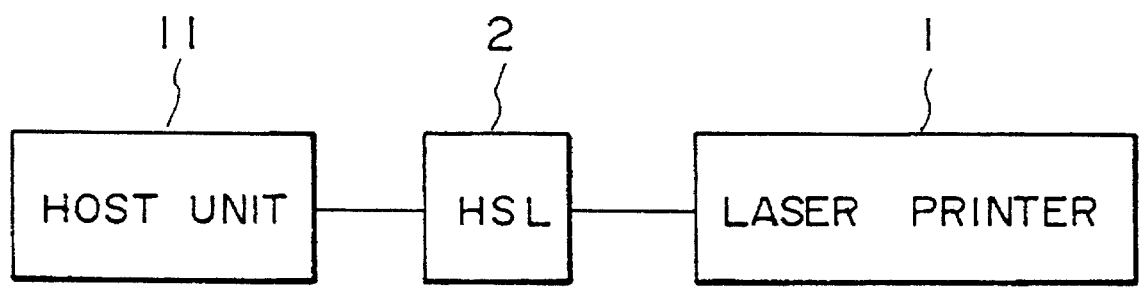
FIG. 1 is a block diagram illustrating a laser printer system including a conventional data transmission unit.
Figure 2:
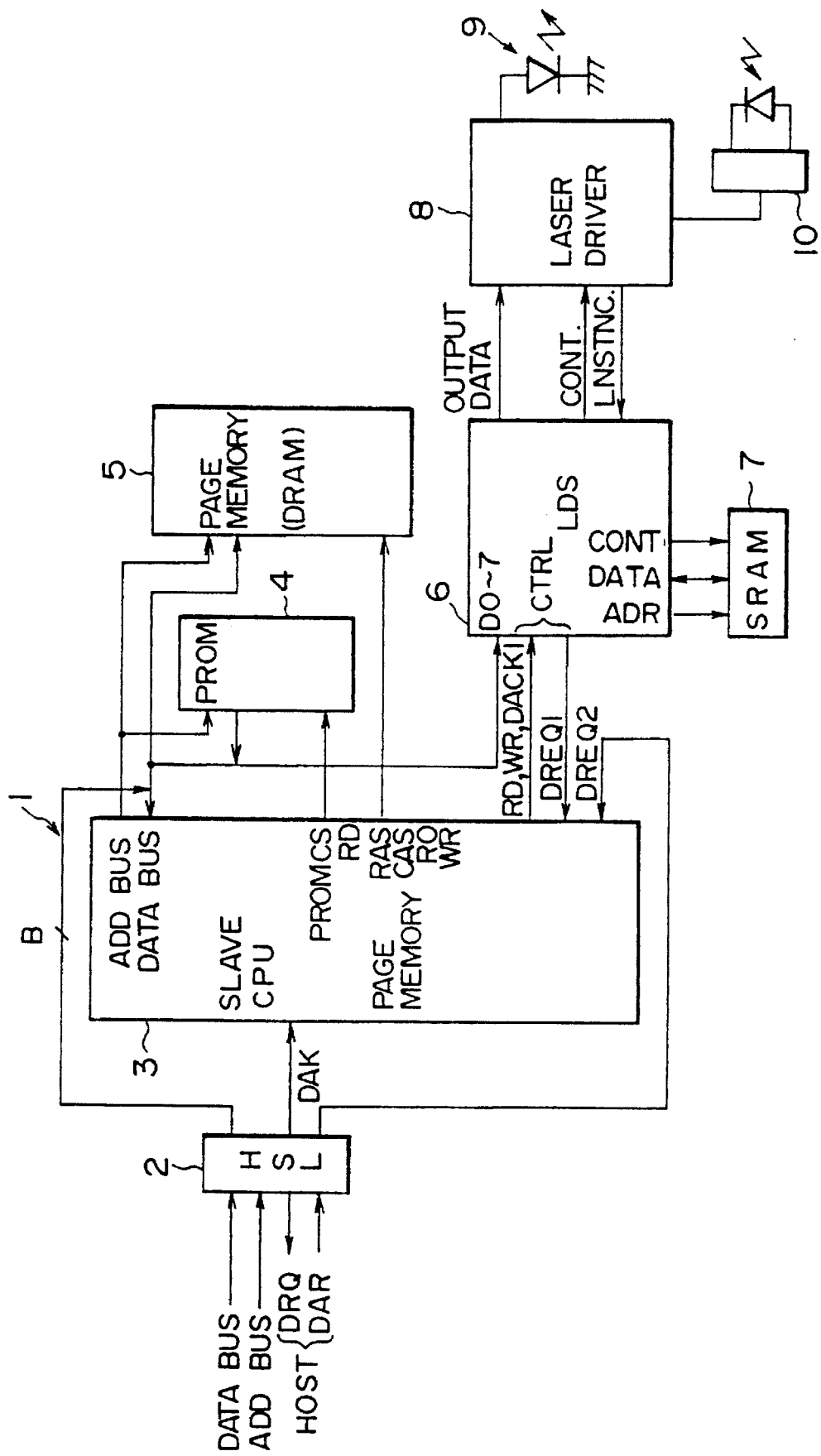
FIG. 2 is a block diagram illustrating a laser printer shown in FIG. 1, the laser printer including the conventional data transmission unit.

The DMAC unit 40 is not provided with a slave CPU 3 used for the DMA transmission process as shown in FIG. 2. The priority of a plurality of DMA channels are switched in a predetermined order, the DMA transmission process is carried out by respective functions provided to the DMA channels. Each of the DMA channels monitors whether or not a data request (DREQ) occurs. When a data request (DREQ) has occurred, the data is transmitted by a corresponding DMA channel in accordance with the corresponding priority. The memory space accessed by the DMA channels corresponds to the page memory 19. The DMA channels has, as the I/O space, a MDA port of the CPU 12 in the host unit 11 (the DMAC 14 of the host unit 11→the page memory 19), an indirect page memory access port (the CPU 13 of the host unit 11→the page memory 19), and a smoothing line buffer port (the page memory 19→the smoothing processing unit 60: for several lines). A time for one process in each DMA channel corresponds to a time for which the parallel data for one unit is converted into serial signals and output, as modulated signals, from the page memory 19. As the phase of the synchronous signal differs from the phase of the DMA channel, the priority of the DMA channel is compulsorily changed by the LDS unit 30 in accordance with the request from the DMAC unit 40. Thus, the output data is always guaranteed.

The PLPDMAR (page memory DMA address reload) register 41 temporarily stores data set in the PDMAR register 24 and outputs the data to the selector(A) 42. The selector(A) 42 selects either the data set in the PDMAR register 24 or an incremented address (INCADR) and outputs, as a base address, the selected information. The selector(B) 43 selects data to be set in the PCPUA (page memory CPU access address) register 47 from either data supplied in the CPU cycle or the INCADR. The selector (C) 44 selects data to be set in the PDMAW register 48 from either data supplied in the CPU cycle or the INCADR.

the PDTADP (plot data address pointer) 45 latches the base address supplied from the selector(A) 42 and outputs it to the selector(D). The PRDTADP (plot reference data address pointer) register 46 latches the INCADR obtained by adding the base address supplied from the selector(A) 42 to an address REFADR (referring an off-set address) and outputs the INDADR. The PCPUA (page memory CPU access address) register 47 stores data representing transmission directions of the address and the image information of the page memory 19 in a case where the image information is transmitted, byte by byte, from the page memory 19 to the host unit 11 and vice versa. The data stored in the PCPUA register 47 is supplied to the selector(D) 49. The PDMAW (page memory DMA write address) register 48 stores an REFADR address used for setting an off-set of the interpolation referring line against the PDMAR address and for storing a start address of the image information in a case where the data is transmitted to the page memory 19 line by line in the DMA transmission mode. The start address set in the PDMAW is supplied to the selector(D) 49. The selector(D) 49 selects one of the outputs from the PDTADP register 45, the PRDTADP register 46, the PCPUA register 47 and the PDMAW register 48. The data selected by the selector(D) 49 is supplied to both the multiplexer 52 and the full-bit adder unit 53. The REFADR (referring off-set address) register 50 stores a referring off-set address used for setting an operation mode of the DMA transmission process, which operation mode has been previously supplied from the host unit 11. The referring off-set address is supplied from the REFADR register 50 to the full-bit adder unit 53. The PMLMT (page memory limit address) register 51 stores an upper limit address, corresponding to the size of the page memory 19, used for setting an operation mode of the DMA transmission process, which operation mode has been previously supplied from the host unit 11.

Figure 8:
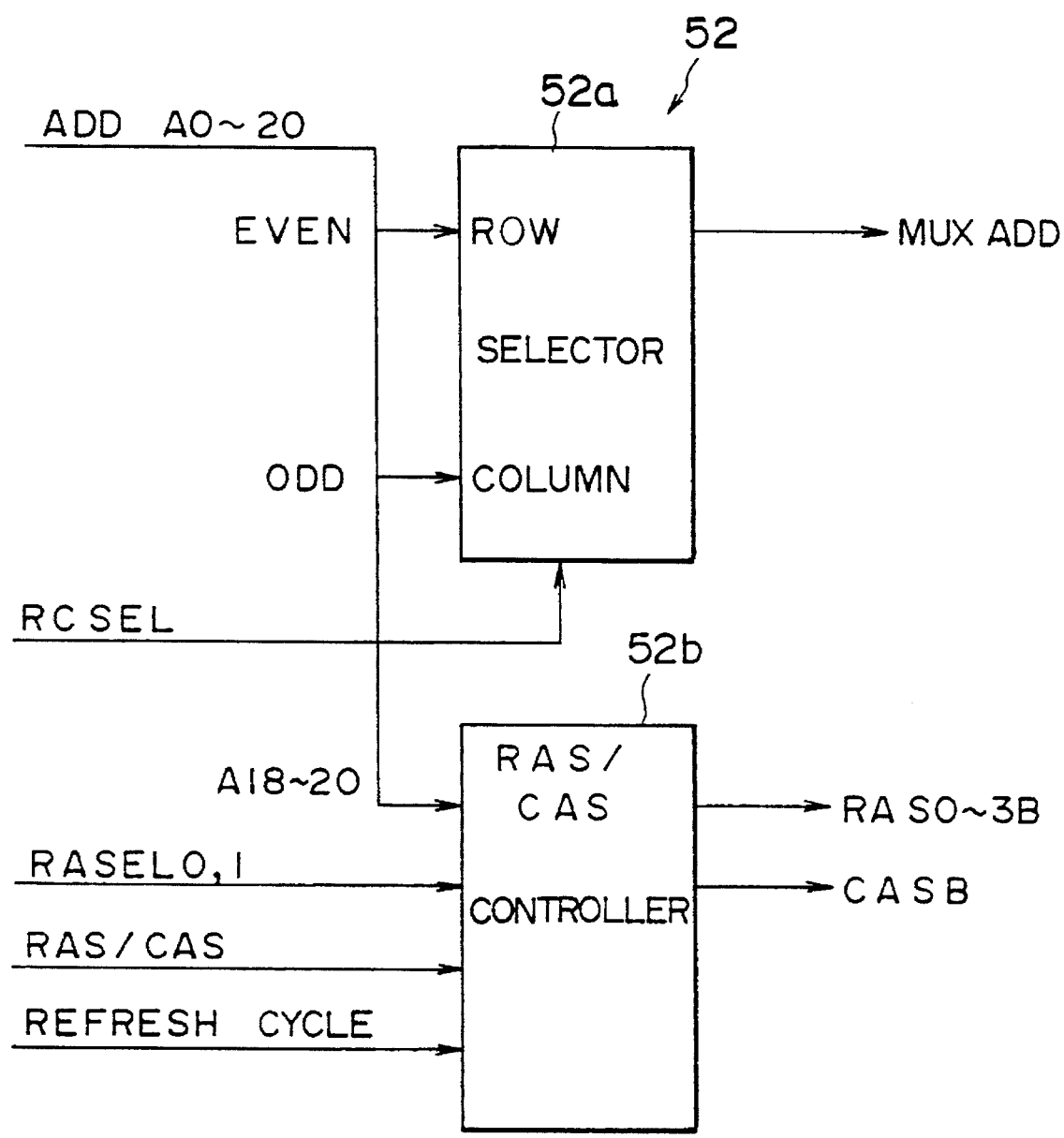
FIG. 8 is a block diagram illustrating a multiplexer provided in the DMAC unit shown in FIG. 5.
Figures 9, 10:
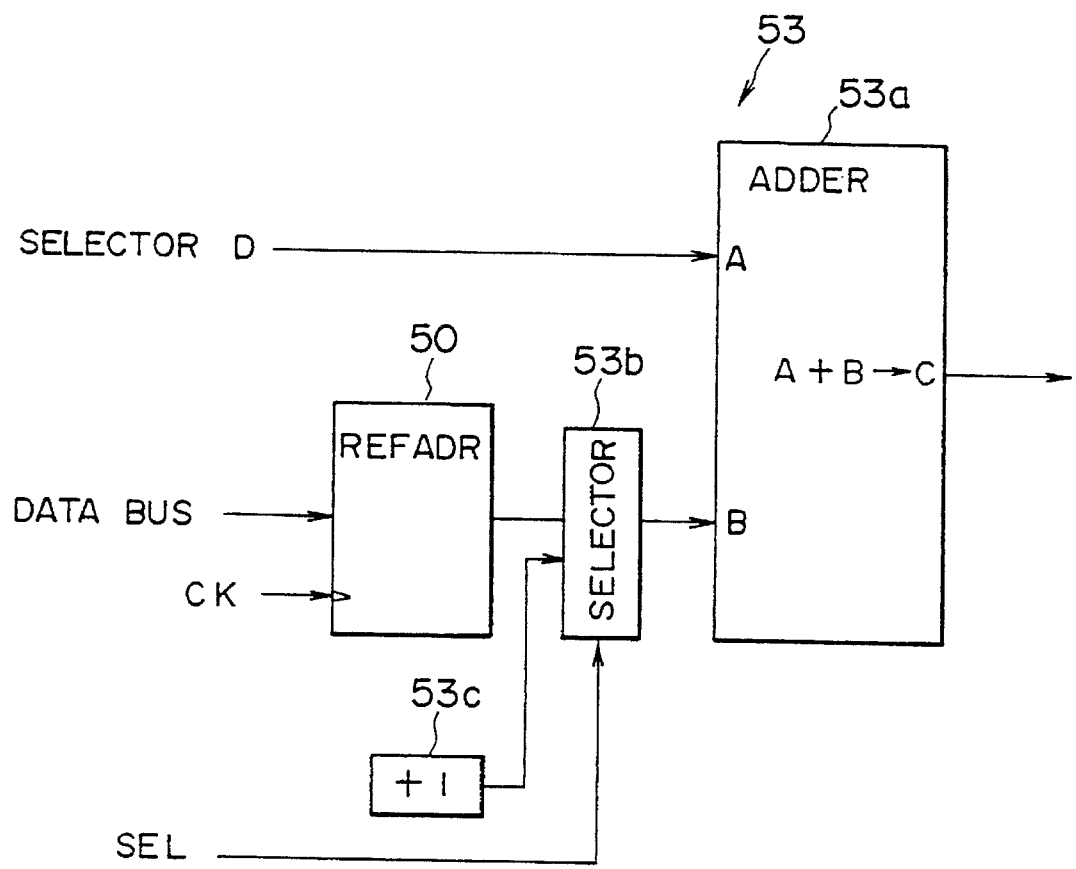
FIG. 9 is a diagram illustrating data processed by the multiplexer shown in FIG. 8.
FIG. 10 is a block diagram illustrating a full-bit adder unit provided in the DMAC unit shown in FIG. 5.

The multiplexer 52 comprises a selector 52a and a RAS/CAS controller 52b as shown in FIG. 8. The selector 52a alternately selects either a ROW address or a COLUMN address int the page memory 19 from the address data A0–A20 supplied from the selector(D) 49. The selected address (MUX ADDRESS) is output, from the multiplexer 52, as an address identifying a position at which the image data is stored in the page memory 19. The address data A0–A20 corresponds to the RAW address and the COLUMN address in the relationship as shown in FIG. 9. The image data is written at the selected address output from the multiplexer 52 in the page memory 19 at a write timing controlled by the RAS/CAS controller 52b. The RAS/CAS controller 52b controls the write timing of the RAW address and the COLUMN address based on the RASSEL signal supplied from the command mode set register 38, the RAS/CAS timing signal supplied from the DMA request processing unit 26 and a refresh cycle signal.

The full-bit adder unit 53 comprises a full-bit adder 53a, a selector 53b and a plus-one adder (+1) 53c as shown in FIG. 10. The selector 53b selects whether or not "+1" is added to the reference off-set address supplied from the REFADR 50 based on the level of a SEL signal. The reference off-set address has a constant value that corresponds to a data length of image data along the width of a scanned document. The full bit adder 53a adds the address (A) supplied from the selector(D) 49 to the data (B) supplied via the selector 53b. The adding result (C) output from the full-bit adder 53a is supplied to the page memory area comparator 54. The level of the SEL signal is switched in accordance with whether or not there is a carry signal depending on the upper address in the page memory 19.

Figure 11:
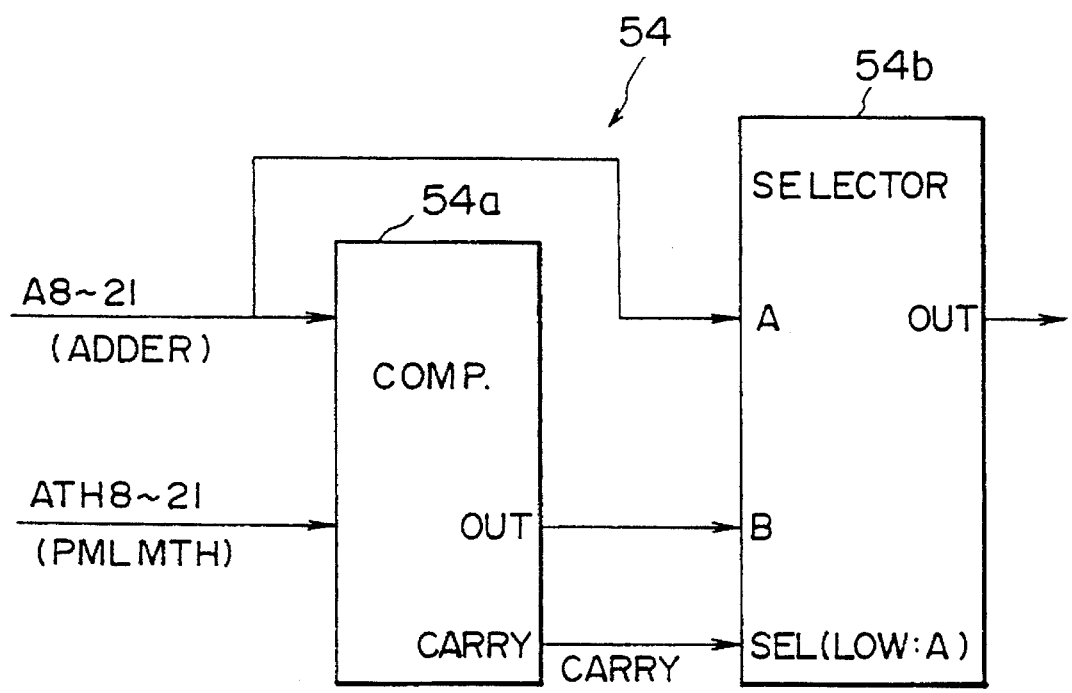
FIG. 11 is a block diagram illustrating a page memory area comparator provided in the DMAC unit shown in FIG. 5.

The page memory area comparator 54 comprises an area comparator 54a and a selector 54b as shown in FIG. 11. The adding result supplied from the full-adder unit 53 and the upper address supplied from the PMLMT register 51 are compared with each other by the area comparator 54a. When the adding result is less than the upper address, the adding result is output to the address feed-back bus via the selector 54b as it is. When the adding result is greater than the upper address, an address value obtained by subtracting the upper address from the adding result is supplied, as the INCADR, to the address feed-back bus.

The PCPUDW (page memory writing data set) register 55 stores image data to be written into the address of the page memory 19, which address was set in the PCPUA register. The set image data is supplied to the page memory 19 or to the smoothing processing unit 60 via an inverter IV4. The PCPUDR (page memory reading data latch) register 56 latches image data read out from the address of the page memory 19, which address was set in the PCPUA register 47, and supplies the latched image data to the PCPUDW register 55 via an inverter IV3. The image data transmitted from the data bus is transmitted to the smoothing processing unit 60 via the DAM data transmission register 57.

In one cycle of the DMA transmission process, the image data for 3 or 4 DMA channels can be read out from the page memory 19 so as to carry out the smoothing process. In this embodiment, as image data in a reference window of 3×4 matrix is used for the smoothing process, the image data for 4 DMA channels corresponding to the number (4) of sub-scanning lines in the reference window is transmitted in one process. When the size of the reference window is changed, the amount of image data corresponding to the number of sub-scanning lines in the reference window is also changed. Thus, the DMAC unit 40 and the smoothing processing unit 60 may be provided with reserve DMA channels so that, even if the size of the reference window is changed, the number of DMA channels can be correspondingly changed.

Referring to FIG. 6, the smoothing processing unit 60 comprises DMA data set ports 61–64, P/S registers 65–68, shift registers 69–72, a reference logic unit 73, a selector 74 and an LD driver 75. When the dot density of the image data supplied from the DMAC unit 40 is less than the dot density of an image which can be formed by the laser printer, image data of each dot is processed with reference to image data of the peripheral dots in accordance with the interpolation technique. As a result, the dot density of the image data supplied from the DMAC unit 40 is modified to meet the standards of the image that can be formed by the laser printer.

A detailed description of the smoothing process will be described below.

The page memory 19 stores image data which has not been interpolated yet. The DMAC unit 40 reads out the image data of every dot and peripheral dots thereof from the page memory 19. The image data read out from the page memory 19 is supplied to a logic unit for processing the image data in accordance with a interpolation algorithm. The logic circuit outputs interpolated image data as modulated image data. After the image data from the page memory 19 is converted into serial image data, the serial image data is interpolated by the logic circuit. The serial image data is shifted in synchronism with the modulation clock signal (SIFTCK) selected based on the synchronous signal line by line.

The image data for 4 DMA channels CH0 through CH3 corresponding the number of lines (n–n+3) in the reference window (3×4 matrix) is set in the DMA data set ports 61–64, and supplied therefrom to the P/S registers 65–68. The P/S registers 65–68 convert the image data for four lines (n–n+3) supplied from the DMA data set ports 61–64 into the serial data in synchronism with the SFTCLK signal and the SIFTLD signal supplied from the line scan data transmission processing unit 37. The serial data output from the P/S registers 65–68 is supplied to the shift registers 69–72. The number of stages in each of the shift registers 69–67 corresponds to the length of the main-scan line. The image data filled in all the stages in each of the shift registers 69–72 are supplied to the reference logic unit 73. The reference logic unit 73 processes the image data for each attentional dot among dots in four lines in accordance with the interpolation algorithm. The interpolated image data is serially supplied from the reference logic unit 73 to the selector 74 dot by dot. The selector 74 selects the serial interpolated image data based on the state information of each scanning supplied from the line scan data transmission processing unit 37. The selector 74 supplies the interpolated image data, as modulation signal, to the LD driver 75. The LD driver 75 drives the laser diode (LD) in accordance with the modulation signal so that the modulated laser beam is emitted from the laser diode.

In FIGS. 5 and 6, the data transmission direction in parts, of the data bus, indicated by dotted thick lines can be switched by the inverters IV1–IV6 controlled by the bus direction switching signal supplied from the DMA request processing unit 26.

Figure 12:
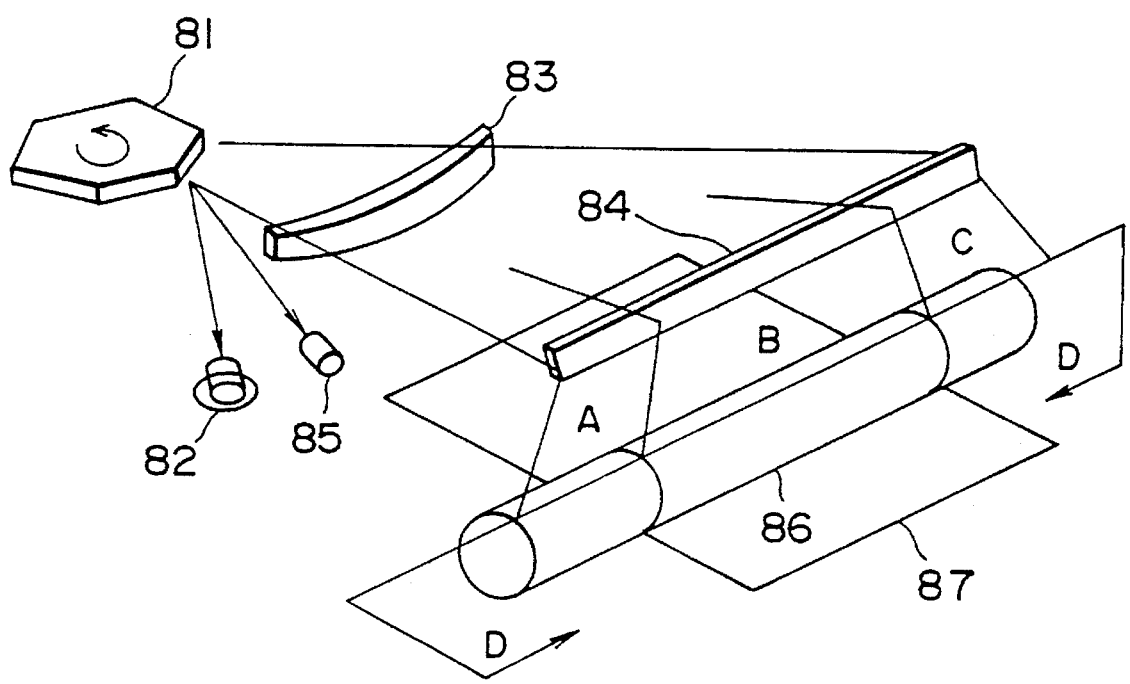
FIG. 12 is a diagram illustrating an optical writing unit provided in the laser printer.

An optical writing unit in the laser printer according to the present embodiment is shown in FIG. 12.

Referring to FIG. 12, the optical writing unit has a polygonal mirror 81. The polygonal mirror 81 is rotated, in a direction indicated by an arrow, by a motor (not shown) driven by an individual driving clock different from a system clock used in this laser printer. The laser beam emitted from a laser diode (LD) 82 is projected onto the polygonal mirror 81. The laser diode (LD) is driven by the LD driver 75 shown in FIG. 6. The laser beam reflected by the rotated polygonal mirror 81 is swung at a uniform angular velocity and is incident on an f-Θ lens 83. The f-Θ lens 83 converts the swing motion of the laser beam so that the spot of the laser beam is moved in a uniform linear motion on a plane onto which the laser beam is projected. The laser beam reflected by the polygonal mirror 81 is also projected onto a photodetector 85. A pin-photodiode is used as the photodetector 85. The photodetector 85 is provided at a position corresponding to a starting position of main-scan line formed by the swung laser beam. The photodetector 85 outputs a detecting signal every time the laser beam is incident to the photodetector 85. The detecting signal is supplied, as the synchronous signal, to the LD modulation clock selecting unit 33. The laser beam emitted from the f-Θ lens 83 is reflected by a mirror 84 and projected onto a photosensitive medium 86.

The photosensitive medium 86 is rotated by a motor (not shown). The laser beam is projected onto the photosensitive medium 86 under a condition in which the photosensitive medium 86 is rotated, so that an electrostatic latent image is formed on the photosensitive medium 86. The electrostatic latent image is developed by a developing unit (not shown), so that a toner image corresponding to the electrostatic image is formed on the photosensitive medium 86. While the photosensitive medium 86 is being rotated, the toner image is transferred from the photosensitive medium 86 to a recording sheet 87 by a transfer unit (not shown). The toner image transferred to the recording sheet 87 is fused and fixed thereof by a fixer unit (not shown).

Figure 13:
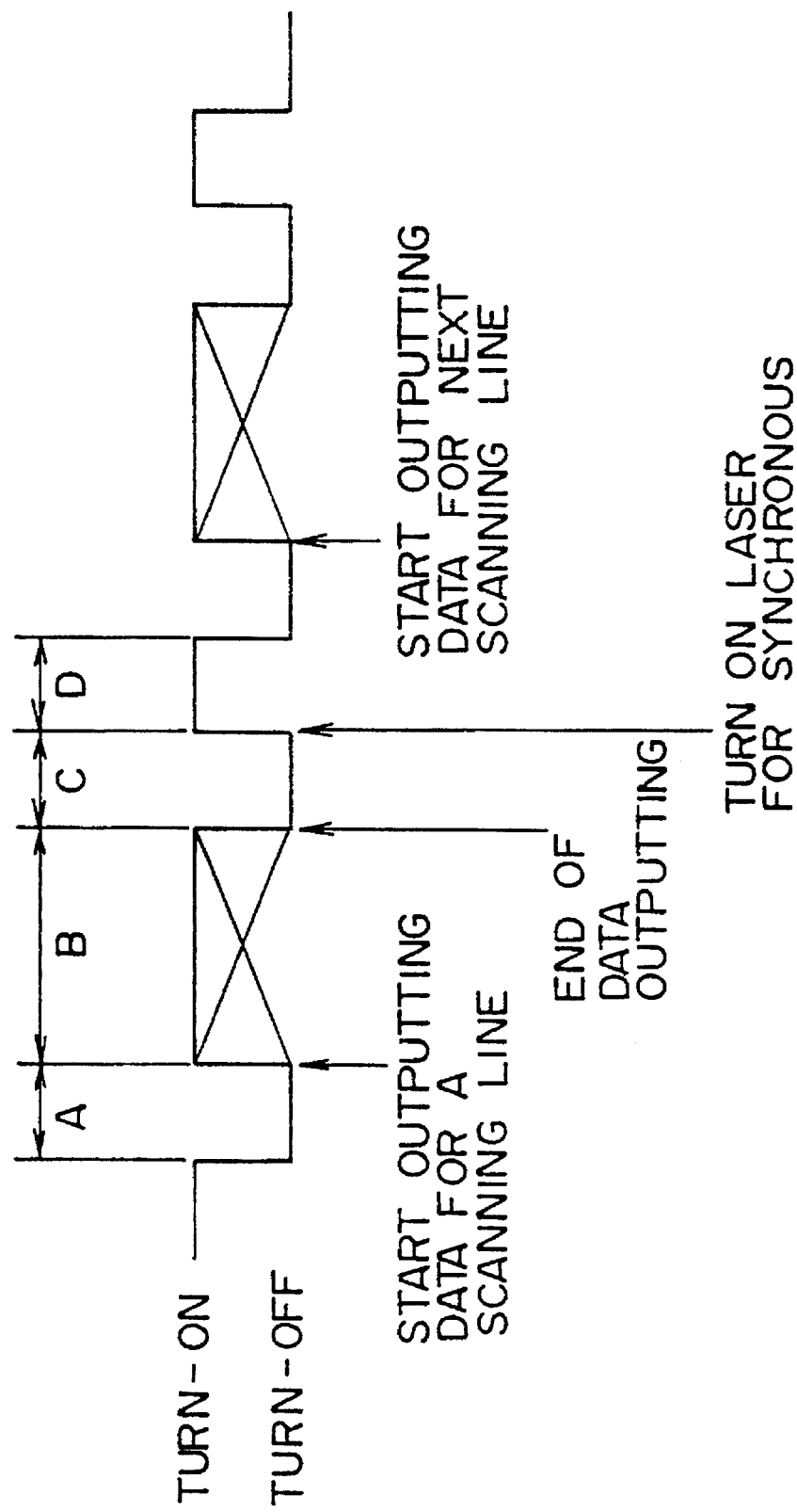
FIG. 13 is a timing chart illustrating a writing process in the optical writing unit shown in FIG. 12.

In FIG. 12, sections A, B, C and D correspond to states of optical writing operation. In the sections A and B (states A and B), the laser diode (LD) 82 is always turned off, and in the sections B and D (states B and D), the laser diode (LD) 82 is turned on, as shown in FIG. 13.

In this embodiment, the image data for 4 lines is transmitted from the host unit 11 to the smoothing processing unit 60 by use of a plurality of DMA channels CH0–CH7. The DMA channels CH0–CH7 are cyclically controlled in accordance with the priority so that the DMA transmission process is sequentially successively performed. In each of the DMA channels CH0–CH7, the DMA transmission process is carried out in the following manner.

Figure 14:
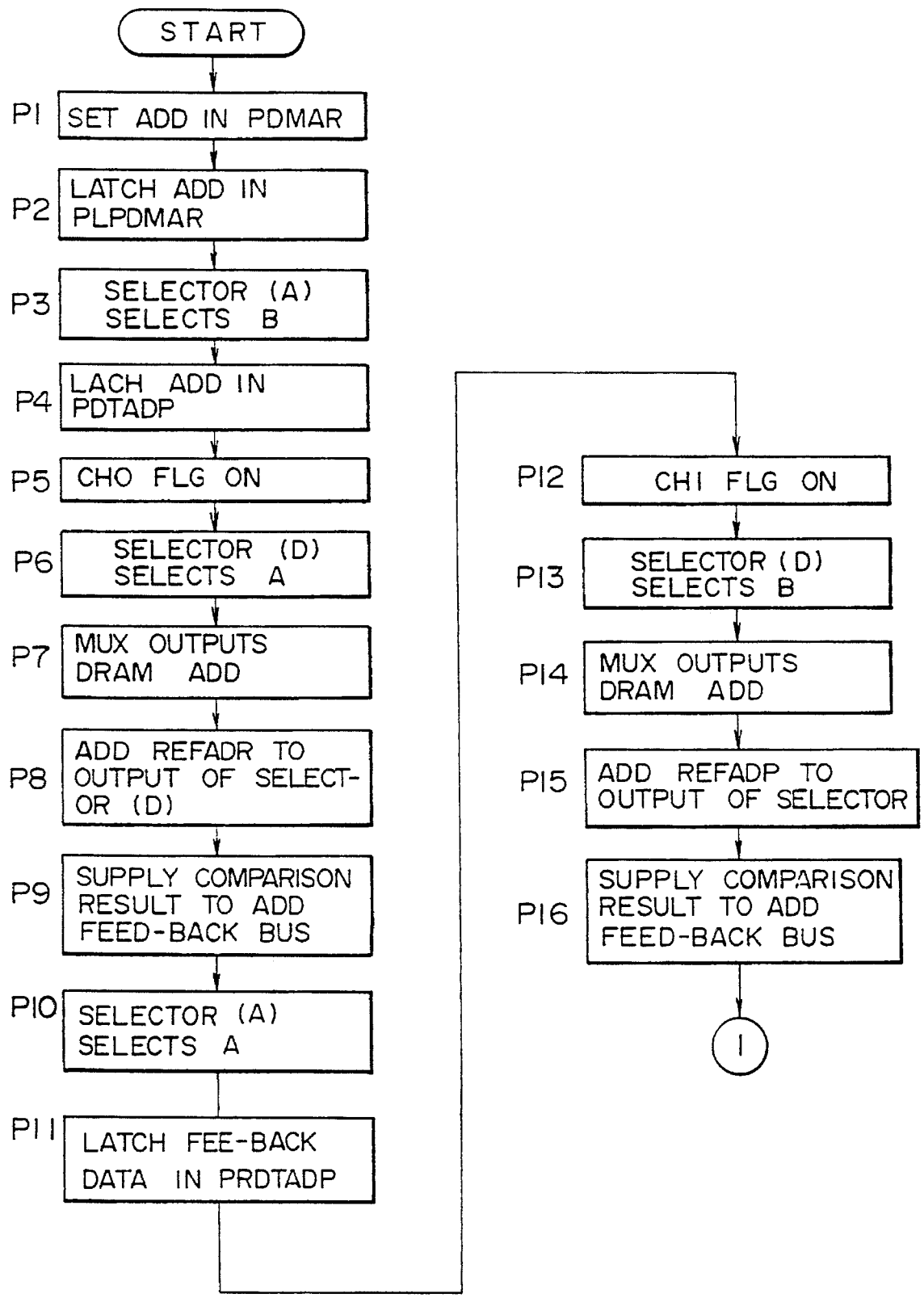
FIGS. 14 and 15 are flow charts illustrating a DMA transmission process performed in DMA channels CH0–CH4 of the DMAC unit shown in FIG. 5.
Figure 15:
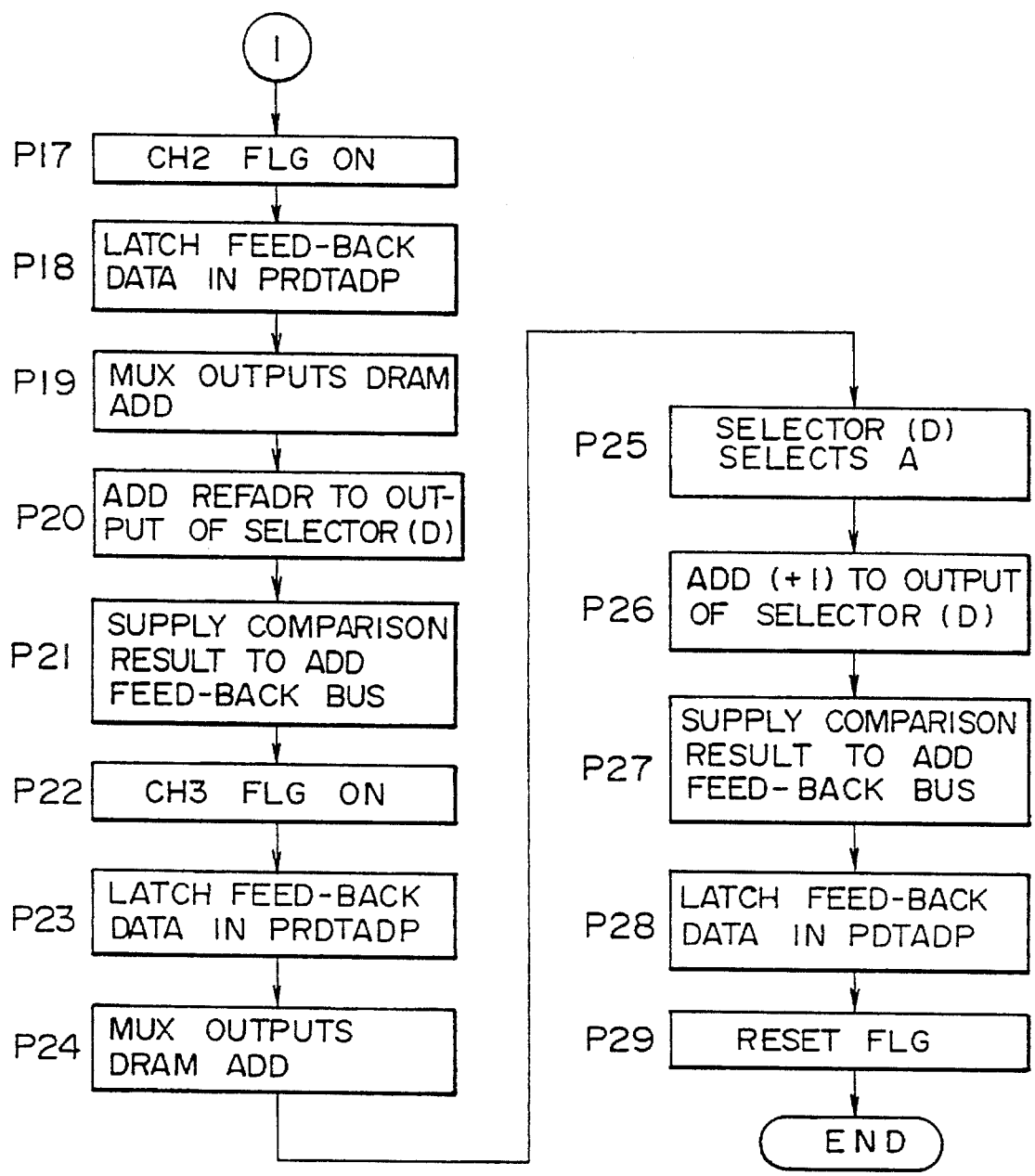

The DMA transmission processes in the DMA channels CH0–CH4 are carried out in accordance with flow charts as shown in FIGS. 14 and 15.

The DMA channels CH0–CH3 are used for transmitting image data for 4 lines (n–n+3) from the page memory 19 to the DMA data set ports 61–64 in the smoothing processing unit 60. The channel CH1 is used for transmitting the image data of the attentional dot, and the other three DMA channels CH0, CH2 and CH3 are used for transmitting the image data of reference dots surrounding the attentional dot. A data transmission request of the channel CH0 occurs under conditions in which a reading address from the host unit 11 is set in the PDMAR register 24 and the page print enable (PE) signal and the line start (LS) signal are set in the DMA request processing unit 26. The transmission processes in the DMA channels CH1–CH3 are sequentially carried out after the process in the channel CH0. When the processes performed in accordance with the following flow charts in the channels CH0–CH3 have been completed, the data transmission request of the channels CH0–CH3 is automatically reset. The channel CH4 is used for a refreshing process of the page memory 19 and for incrementing the PDTADP register 45 by one (+1). The refreshing process is carried out every time the DMA transmission process is completed, and the process for incrementing the PDTADP register 45 by one (+1) is carried out after the process in the DMA channel CH3.

Figure 16:
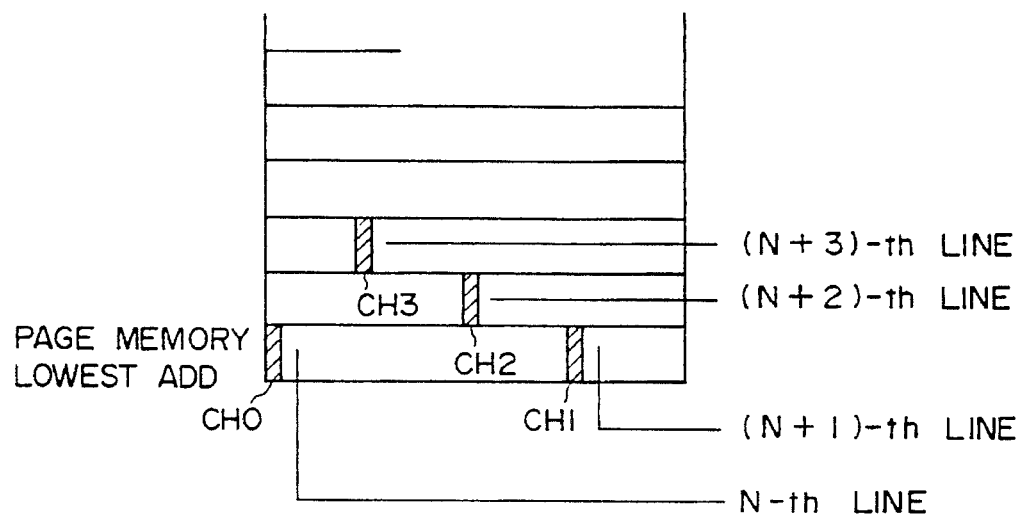
FIG. 16 is a diagram illustrating image data stored in a page memory shown in FIG. 5.
Figure 17A:
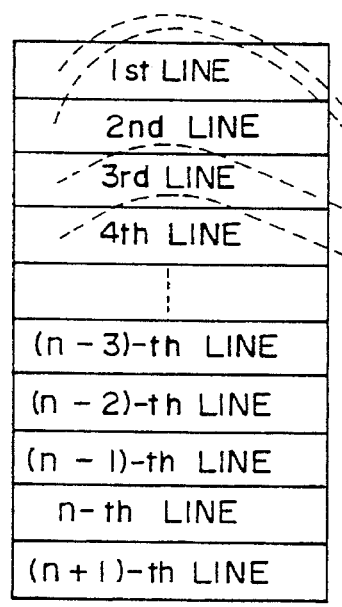
FIG. 17 is a diagram illustrating states where image data corresponding to reading lines is stored in the page memory shown in FIG. 5.
Figure 17B:
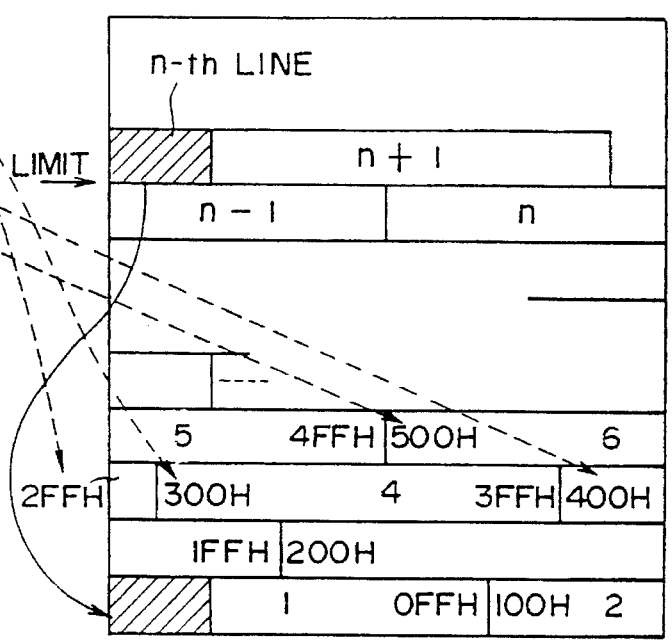
Figure 18:
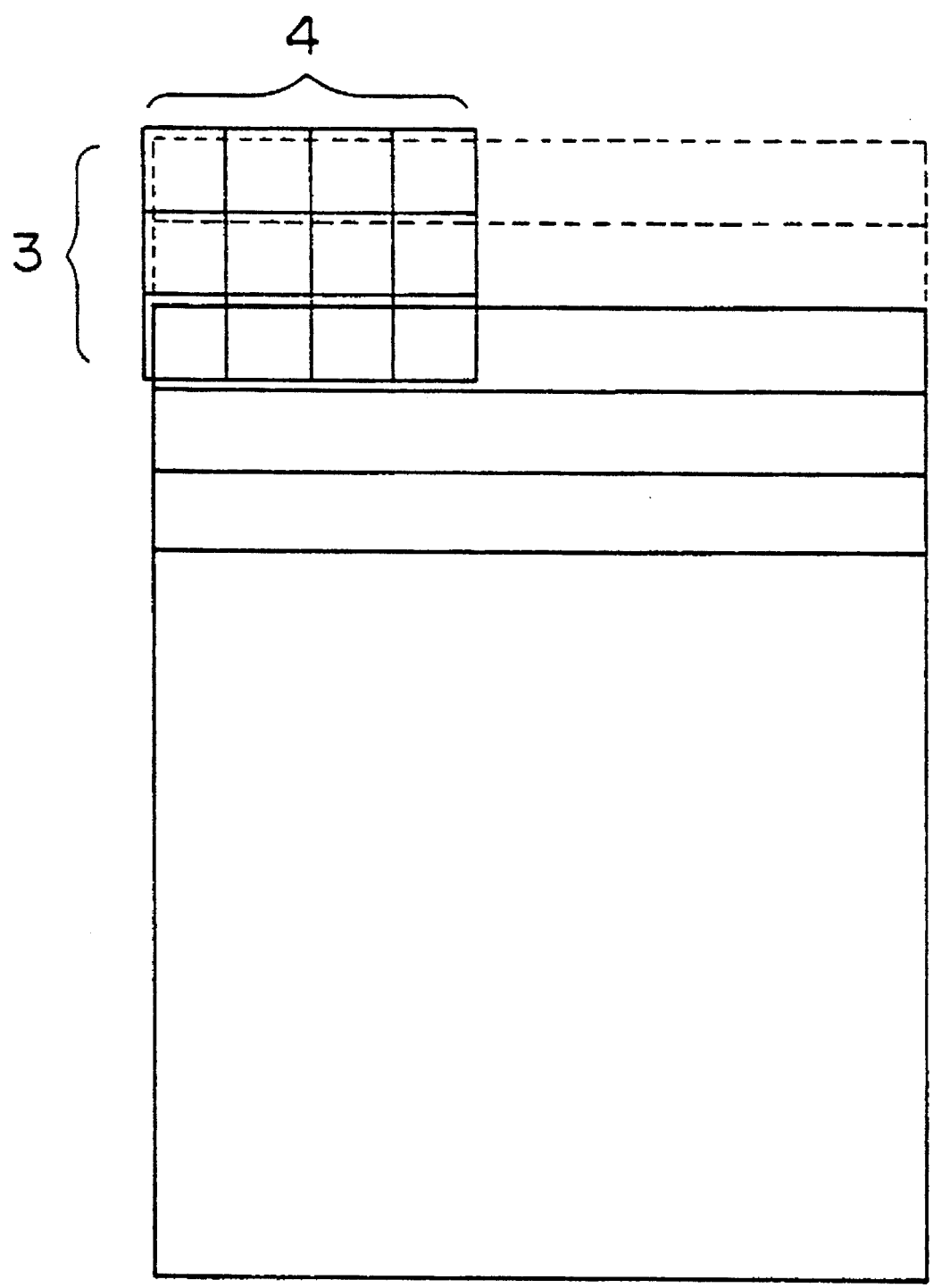
FIG. 18 is a diagram illustrating a reference window used in a smoothing process.

The image data is transmitted from the host unit 11 via the DMA channels CH0–CH3 scan by scan, and the image data is successively stored in the page memory 19 strating from a lowest allocation address, as shown in FIG. 16. A line number is provided to a start address of each scan line. When the image data successively to be stored into the page memory 19 exceeds the upper limit address of the page memory 19, the excess image data is successively stored in the page memory 19 in allocation starting from the lowest address thereof, as shown in FIG. 17. FIG. 18 shows the reference window (3×4 matrix) used in the smoothing process in this embodiment.

Referring to FIG. 14, at start of scanning, a read address supplied from the host unit 11 is set in the PDMAR register 24 in step P1, and then the read address is latched in the PLPDMAR register 41 in step P2. The selector(A) 42 selects the input B and the read address is set in the PDTADP register 45 in step P3. When the PDTADP register 45 latches the read address in step P4, an operation flag of the DMA channel CH0 is set and the process in the DMA channel CH0 starts, in step P5. After this, the selector(D) 49 selects the input A and the read address is supplied to both the multiplexer 52 and the full-bit adder unit 53, in step P6. When the multiplexer 52 supplies the read address to the page memory 19 in step P7, the full-bit adder unit 53 adds a reference off-set address value set in the REFADR register50 to the read address in step P8. The page memory area comparator 54 compares the adding result obtained by the the full-bit adder unit 53 to the upper limit address value set in the PMLMT register 51, and the comparison result address, of the DMA channel CH0, obtained by the page memory area comparator 54 is fed back to the selectors 42, 43 and 44 via the address feed back bus, in step P9. Then, the selector(A) 42 selects the input A, and the comparison result address of the DMA channel CH0 supplied via the address feed back bus is set and latched in the PRDTADP register 46, in steps P10 and P11. After this, the operation flag of the DMA channel CH0 is reset, and the process in the DMA channel CH0 is completed.

After the process in the DMA channel CH0 is completed, an operation flag of the DMA channel CH1 is set and the process in the DMA channel CH1 starts in step P12. The selector(D) selects the input B, and the comparison result address, of the DMA channel CH0, latched in the PRDTADP register 46 is supplied to the multiplexer 52, in step P13. The multiplexer 52 supplies the comparison result address of the DMA channel CH0 to the page memory 19 in step P14. The full-bit adder 53 adds the reference off-set address value set in the REFADR register 50 to the comparison result address, and the adding result obtained by the full-bit adder 53 is supplied to the page memory area comparator 54, in step P15. After this, the page memory area comparator 54 compares the adding result to the upper limit address set in the PMLMT register 51. The comparison result address, of the DMA channel CH1, obtained by the page memory area comparator 54 is fed back to the selectors 42, 43 and 44 in step P16 via the address feed back bus. Then, the operation flag of the DMA channel CH1 is reset, and the process in the DMA channel CH1 is completed.

After the operation flag of the DMA channel CH1 is reset, the process proceeds to step P17 in the flow chart shown in FIG. 15. Referring to FIG. 15, the operation flag of the DMA channel CH2 is set and the process in the DMA channel CH2 starts in step P17. The comparison result address of the DMA channel CH1 supplied via the address feed back bus is set and latched in the PRDTADP register 46 in step P18. The comparison result address, of the DMA channel CH1, set in the PRDTADP register 46 is supplied to the multiplexer 52 via the selector(D) 49, and the multiplexer 52 outputs the comparison result address of the DMA channel CH1 to the page memory 19 in step P19. Then, the full-bit adder unit 53 adds the reference off-set address value to the comparison result address supplied from the selector(D) 49 in step 20. The adding result obtained by the full-bit adder unit 53 is supplied to the page memory area comparator 54. The page memory area comparator 54 compares the adding result supplied from the full-bit adder unit 53 to the upper limit address value set in the PMLMT register 51, and the comparison result address, of the DMA channel CH2, obtained by the page memory area comparator 54 is supplied to the selectors 42, 43 and 44 via the address feed back bus in step P21. After this, the operation flag of the DMA channel CH2 is reset and the process in the DMA channel CH2 is completed.

After the process in the DMA channel CH2 is completed, an operation flag of the DMA channel CH3 is set and the process in the DMA channel CH3 starts, in step P22. The comparison result address of the DMA channel CH2 supplied via the address feed back bus is set and latched in the PRDTADP register 46 in step P23. The comparison result address of the DMA channel CH2 which has been latched in the PRDTADP register 46 is supplied to the multiplexer 52, and the multiplexer 52 supplies the comparison result address of the DMA channel CH2 to the page memory 19, in step P24. Then the operation flag of the DMA channel CH3 is reset and the process in the DMA channel CH3 is completed.

After this, an operation flag of the DMA channel CH4 is set and the process in the DMA channel CH4 starts. The selector (D) 49 selects the input A, and the read address is supplied to the full-bit adder unit 53, in step P25. The full-bit adder unit 53 adds "+1" to the read address, and the adding result obtained by the full-bit adder unit 53 is supplied to the page memory area comparator 54, in step P26. Then, the page memory area comparator 54 comparares the adding result to the upper limit address set in the PMLMT register 51, the comparison result, of the DMA channel CH4, obtained by the page memory area comparator 54 is supplied to the selectors 42, 43 and 44, in step P27. The comparison result of the DMA channel CH4 is set and latched in the PRDTADP register 46 in step P28. After this, the operation flag of the DMA channel CH4 is reset and the process in the DMA channel CH4 is completed, in step P29.

Due to the above processes in the DMA channels CH0–CH3, addresses, in the page memory 19, at which the image data for 4 lines (n–n+3) is to be stored are transmitted sequentially. Due to the above process in the DMA channel CH4, the refresh process of the DRAM forming the page memory 19 is sequentially carried out after the address transmission processes in the DMA channels CH0–CH3.

Figure 19:
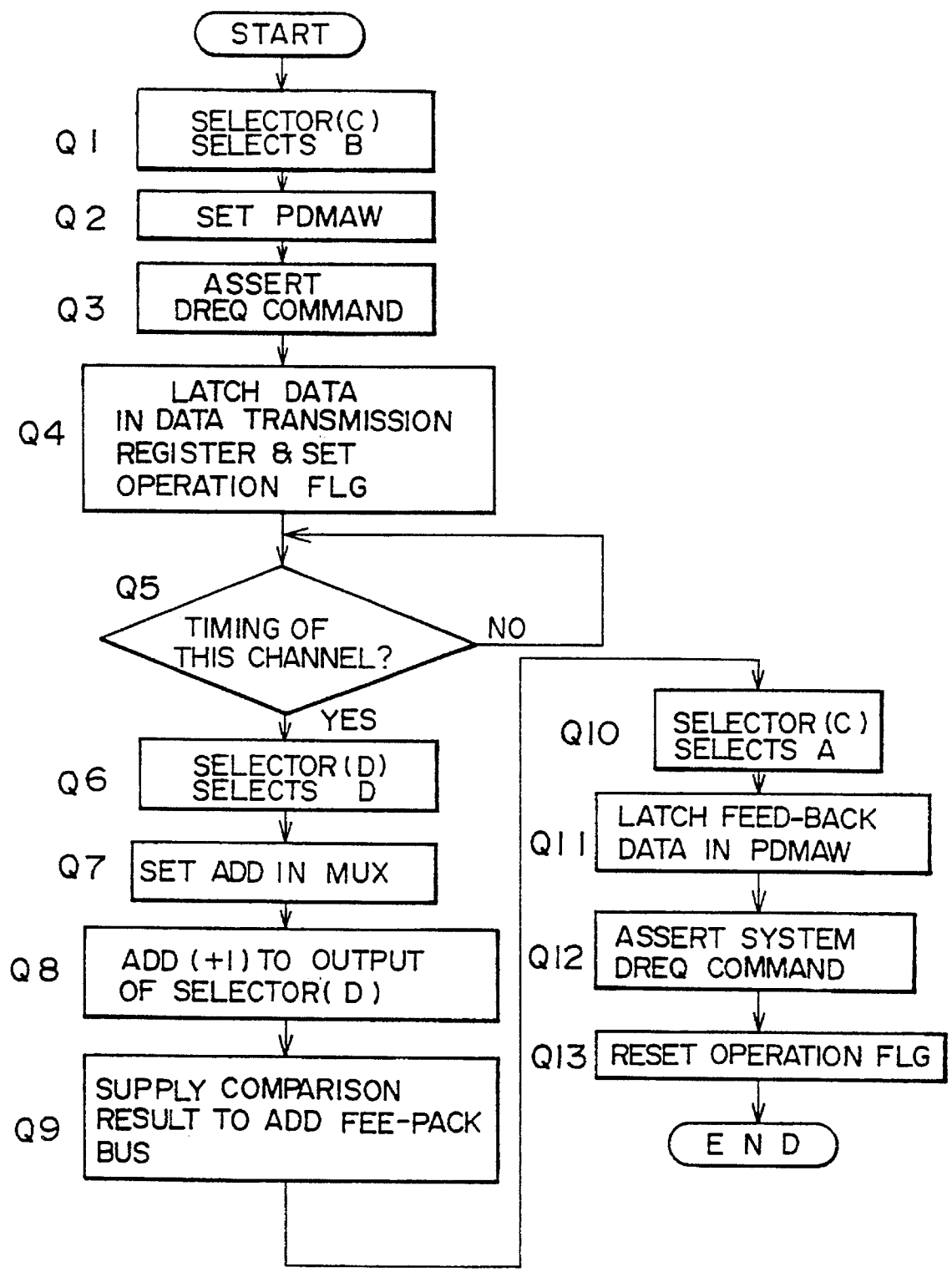
FIG. 19 is a flow chart illustrating a DMA transmission process in a DMA channel CH5 of the DMAC unit shown in FIG. 5.
Figure 20:
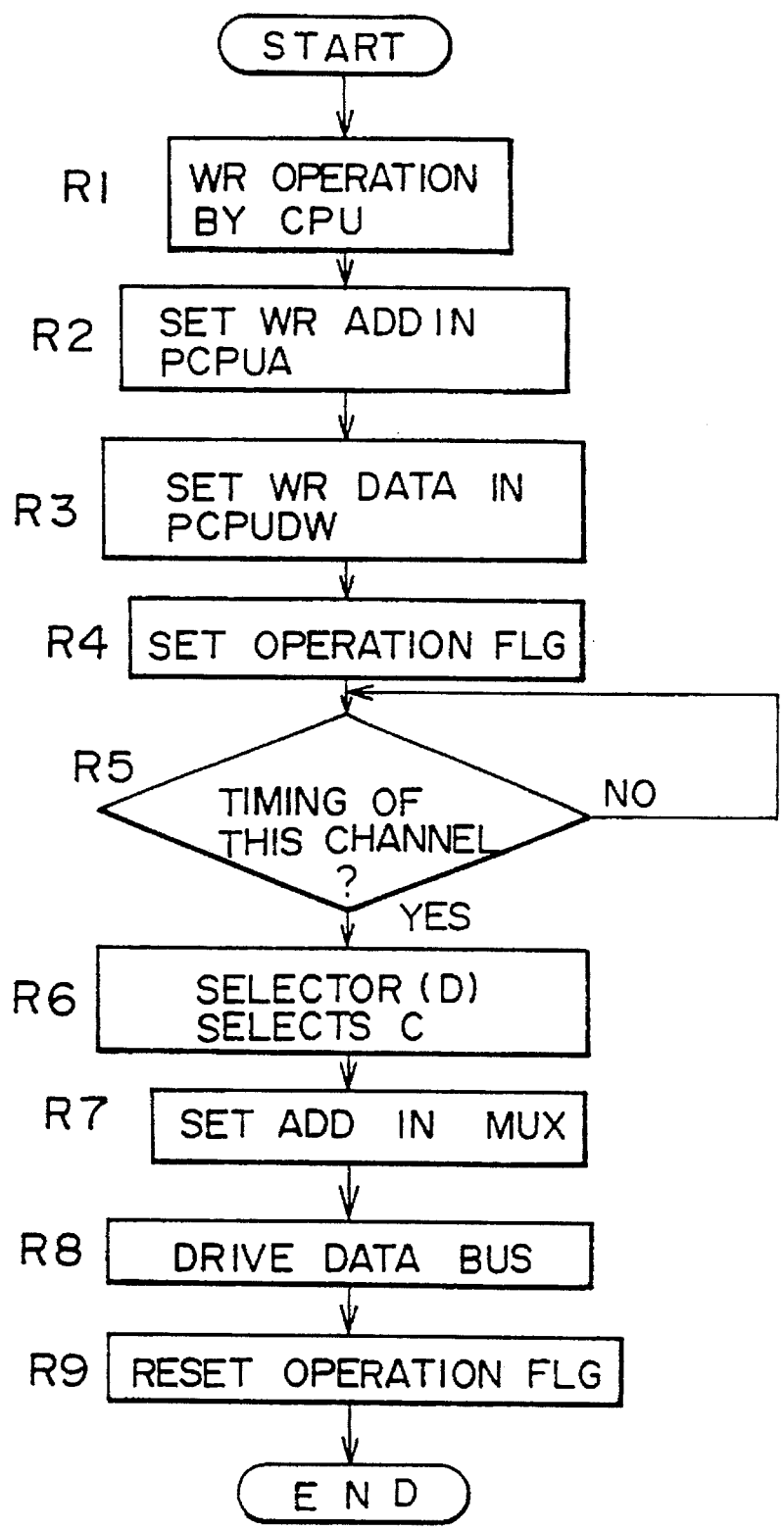
FIG. 20 is a flow chart illustrating a DMA transmission process for writing image data in a DMA channel CH6 of the DMAC unit shown in FIG. 5.
Figure 21:
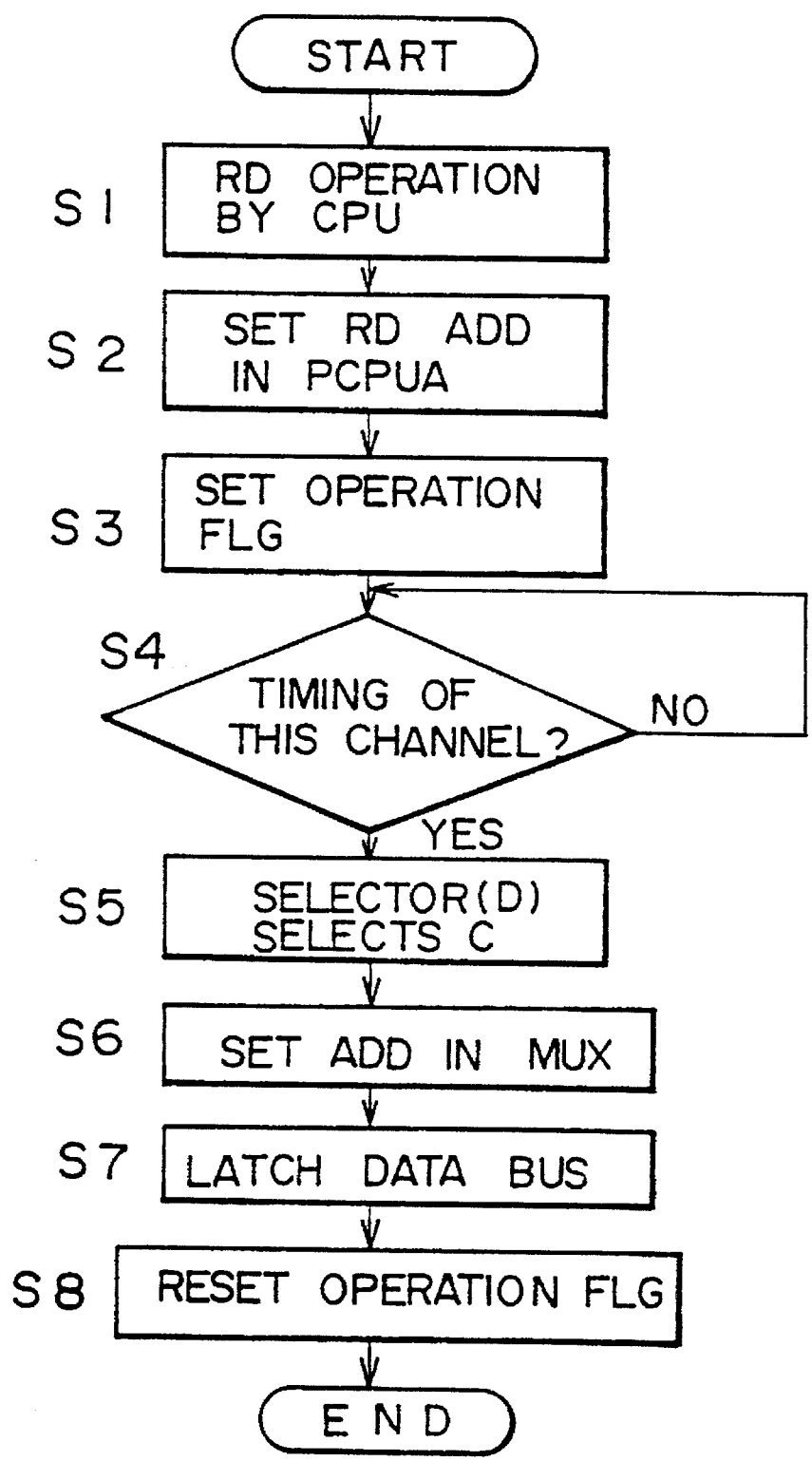
FIG. 21 is a flow chart illustrating a DMA transmission process for reading out image data in a DMA channel CH6 of the DMAC unit shown in FIG. 5.

The DMA transmission processes in the DMA channels CH5 and CH6 are carried out in accordance with flow charts as shown in FIGS. 19, 20 and 21.

The DMA channel 5 is used for setting an address, to which the image data should be transmitted, in the PDMAW register 48 when the image data is transmitted from the host unit 11 to the page memory 19 in the DMA transmission mode. Due to setting the address in the PDMAW register 48, the data request command DREQ is set. Then, after the image data supplied from the DMAC 14 of the host unit 11 is written in the hand-shake logic unit 22 based on the DACK command, the data request command DREQ is reset. The DMA channel CH6 is used for indirectly controlling the access of the CPU 12 from the host unit 11 to the page memory 19. When the WR command is input to the PCPUA register 47, the RD command is set in the PCPUDW register 55, and a flag of the WR mode is set, the DMA channel is activated. After the process in the DMA channel CH6 is completed, the DMA channel CH6 is automatically reset.

In a case of a data reading process in the DMA channel CH6, when the read address of the page memory 19 is set in the PCPUA register 47, the DREQ command for the DMA channel CH6 is set so that the image data is transmitted from the page memory 19 to the read register in the DMA transmission mode. The read strobe signal is supplied to the page memory 19 so that the DMA transmission process is carried out at timing when the DMA channel CH6 is activated. A latch clock is input to the PCPUDR register 56, and after the process is completed, the data request command DREQ is reset.

In a case of a data writing process, the image data to be written has been previously set in the PCPUDW register 55. When the write address is setting the PCPUA register 47, the data request command DREQ is set and the DMA transmission process is carried out by use of the DMA channel CH6. After this, the data request command DREQ command is reset.

Referring to FIG. 19, which shows a flow chart of the DMA transmission process in the DMA channel CH5, when the DACK command supplied from the DMAC 14 of the host unit 11 is input to the hand-shake logic 22, an operation flag of the DMA channel CH5 is set and the selector(C) 44 selects the input B, in step Q1. The data supplied to the PDMAW register 48 via the selector(C) 44 is set in the PDMAW register 48 in step Q2. Then, the DMA channel CH5 is enabled and the data request command DREQ is supplied to the DMAC 14 of the host unit 11 via the hand-shake logic 22, in step Q3. The image data transmitted from the DMAC 14 to the data bus is latched in the DMA data transmission register 57 and the operation flag is set, in step Q4. It is determined whether or not it is an operation timing of the DMA channel CH5 now in step Q5. When the result obtained in step Q4 is YES, the selector(D) 49 selects the input D and the write address is supplied to both the multiplexer 52 and the full-bit adder unit 53 via the data bus, the selector(C) 44 and the PDMAW register 48, in steps Q6 and Q7. The full-bit adder unit 53 adds "+1" to the write address and the adding result obtained by the full-adder unit 53 is supplied to the page memory area comparator 54, in step Q8.

After this, the page memory area comparator 54 compares the adding result obtained by the full-adder unit 53 to the upper limit address set in the PMLMT register 51, and the comparison result obtained by the page memory area comparator 54 is supplied to the selectors 42, 43 and 44 via the address feed back bus, in step Q9. The selector(C) 44 selects the input A and the comparison result is set in the selector(C) 44 in step Q10. The write address set in the selector(C) 44 is latched in the PDMAW register 48 in a line cycle lastly in step Q11. Then, the data request command DREQ for the next line is supplied to the DMAC 14 via the hand-shake logic 22 in step Q12, the operation flag of the DMA channel CH5 is reset, and the process in the DMA channel CH5.

FIG. 20 shows a flow chart illustrating a process, in the DMA channel CH6, for transmitting image data from the host unit 11 to the page memory 19 in the DMA transmission mode and for writing the image data into the page memory.

Referring to FIG. 20, the CPU 12 of the host unit 11 outputs the WR command in step R1, the selector(B) 43 selects the input B, the write address is set in the PCPUA register 47 in step R2, and the image data to be set in the PCUDW register 55 is prepared in step R3. Then, an operation flag of the DMA channel CH6 is set in step R4, and it is determined whether or not it is an operation timing of the DMA channel CH6 now in step R5. When the result obtained in step R5 is YES, the selector(D) 49 selects the input C and the write address is supplied to the multiplexer 52 via the data bus, the selector(C) 44 and the PDMAW register 48, in steps R6 and R7. The inverter IV4 connected to the data bus is controlled, the image data set in the PCPUDW register 55 is written into the write address in the page memory 19 in step R8, the operation flag is reset and the process of the DMA channel CH6 is completed in step R9.

FIG. 21 shows a flow chart illustrating a process, in the DMA channel CH6, for reading out image data from the page memory 19 in the DMA transmission mode.

Referring to FIG. 21, the RD command is output from the host unit 11 in step S1, the selector(B) 43 selects the input B, and the read address is set in the PCPUA register 47, in step S1. Then, an operation flag of the DMA channel CH6 is set in step S3 and it is determined whether or not it is an operation timing of the DMA channel CH6 now in step S4. When it is determined that it is the operation timing of the DMA channel CH6 now in step S4, the selector(D) 49 selects the input C and the read address is supplied to the multiplexer 52 via the data bus, the selector(B) 43 and the PCPUA register 47, in steps S5 and S6. Then, the inverter IV6 is controlled so that the image data is read out from the read address in the page memory and the image data read out from the page memory is set in the PCPUDR register 56 in step S7. After this, the operation flag of the DMA channel CH6 is reset and the process in the DMA channel CH6 is completed in step S8.

As has been described above, after the processes in the DMA channels CH0–CH3, the process in the DMA channels CH6 and CH6 are carried out, so that the image data positioned in the reference window (the 3×4 matrix) and used for the smoothing process is transmitted from the DMAC 14 of the host unit 11 to the page memory 19 in the DMA transmission mode. Further, the image data used for the smoothing process is transmitted from the page memory 19 to the smoothing processing unit 60 along with the read address and the write address in the DMA transmission process. In these DMA transmission processes, the slave CPU provided in the conventional system is not used. That is, the DMA transmission processes can be carried out by use of the registers, multiplexer and the adder and other hardware in this embodiment.

Timing charts indicating states of various signals and data used for the DMA transmission process in the DMA channels CH0–CH6 are shown in FIGS. 22 through 25.

Figure 22:
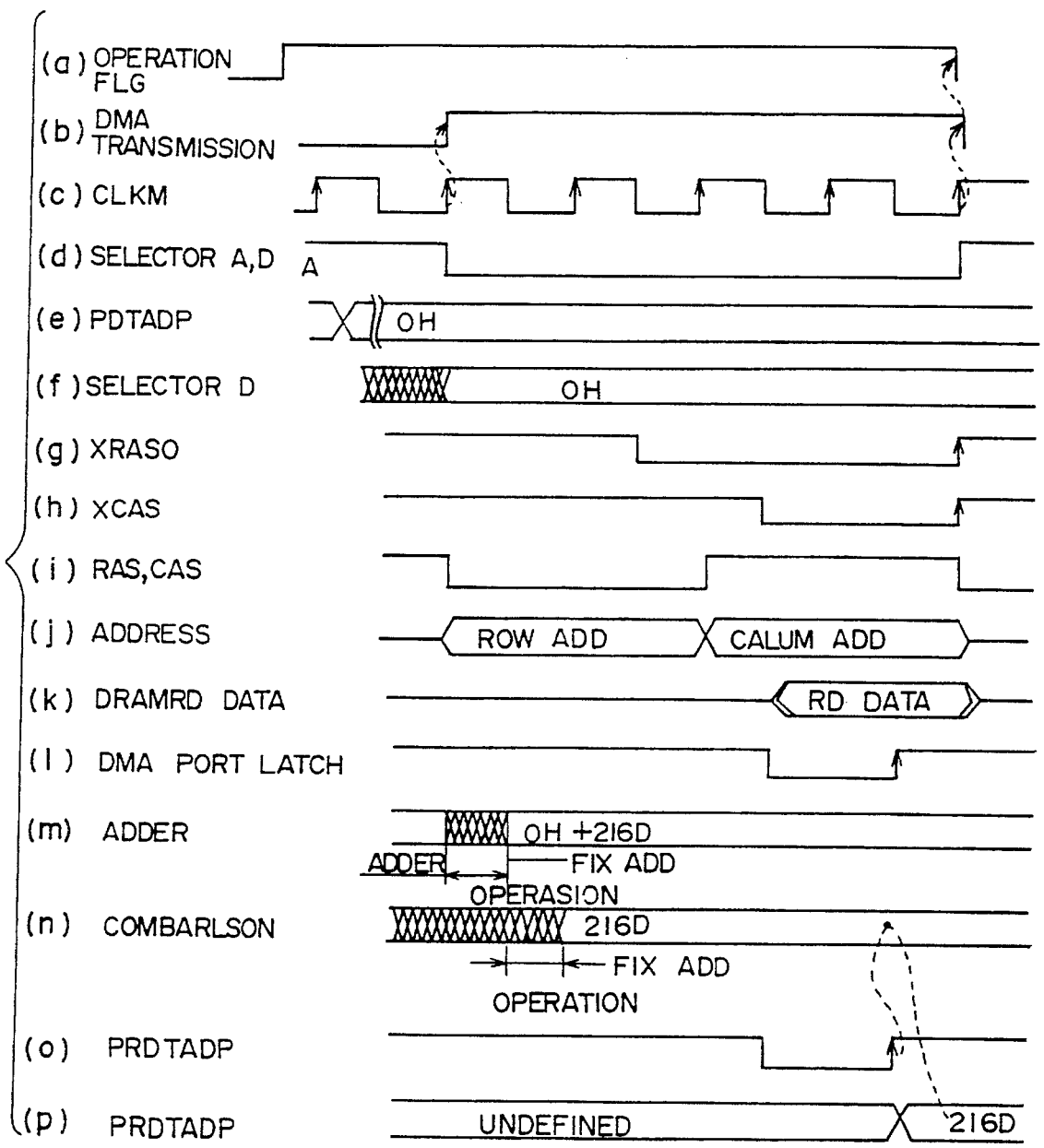
FIG. 22 is a timing chart illustrating states of various signals generated in the DMAC unit shown in FIG. 5.

FIG. 22 shows a timing chart illustrating states of signals and data generated in the DMAC 40. The timing start shown in FIG. 22 indicates:

(a) a state of the operation flag;

(b) timing under the DMA transmission;

(c) the master clock signal CLKM;

(d) the operation timing of the selector 42 and 49 (d);

(e) timing at which the read address is set in the PDTADP register 45;

(f) address output timing of the selector(D) 49;

(g) timing at which the RAS signal is output from the multiplexer 52 ("X" indicates a negative-true logic);

(h) timing at which the CAS signal is output from the multiplexer 52;

(i) switching timing of RAS and CAS signals;

(j) an output timing of the ROW and COLUMN address data identifying the RAS and CAS signals;

(k) timing at which the data is read out from the page memory 19;

(l) timing at which latch pulses are supplied to the DMA data set ports 61–64 in the smoothing processing unit 60;

(m) operation timing of the full-bit adder unit 53;

(n) operation timing of the page memory area comparator 54;

(o) timing at which the INCADR is latched in the PRDTADP register 46; and (p) timing at which the INCADR is output from the PRDTADP register 46 to the selector(D) 49.

The DMA transmission process is carried out in accordance with the timing chart as shown in FIG. 22 so that the image data is transmitted from the host unit 11 to the page memory 19 and from the page memory 10 to the smoothing processing unit 60.

Figure 23:
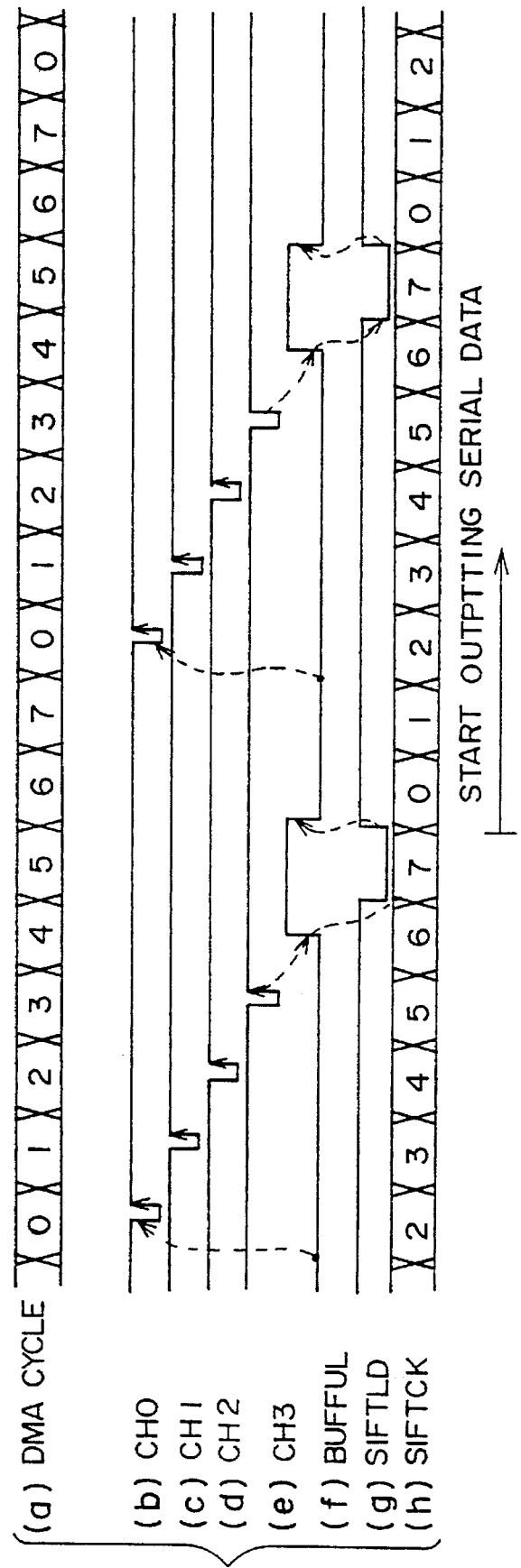
FIG. 23 is a timing chart illustrating states of various signals in a case where the DMA cycle timing and the process timing of DMA data set ports and P/S registers are in synchronism with each other.

FIG. 23 shows a timing chart illustrating operations of the DMA data set ports 61–64 in the smoothing processing unit 60 in a case where the parallel-to-serial conversion (P/S) process in the smoothing processing unit 60 is in time for receiving the image data transmitted from the page memory 19 by used of the DMA channels CH0–CH6. The timing chart shown in FIG. 22 indicates:

(a) cycle timing of the DMA channels;

(b)–(e) timing at which the image data is latched in the DMA data set ports 61–64;

(f) timing BUFFUL at which the image data is completely latched in all the DMA data set ports 61–64;

(g) timing at which the SIFTLD signal is supplied from the line scan data transmission processing unit 37 to the P/S registers 65–68; and (h) timing at which the SIFTCK signal is supplied from the line scan data transmission processing unit 37 to the P/S registers 65–68.

Figure 24:
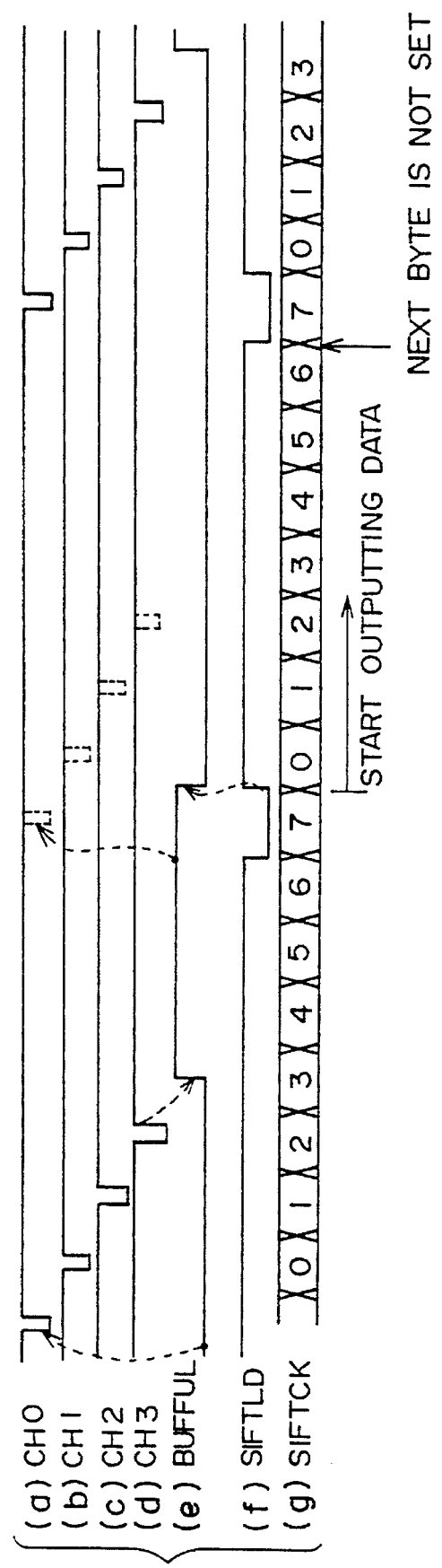
FIG. 24 is a timing chart illustrating states of various signals in a case where the DMA cycle timing and the process timing of the DMA data set ports and the P/S registers are in an asynchronous state.

In the operations shown in FIG. 23, the image data is latched in the DMA data set ports 61–64 in synchronism with output timing of the image data in the P/S registers 65–68, and the cycle timing of the DMA channel is not changed. However, as the DMA transmission process is carried out in asynchronism with the optical scanning process in the optical writing unit as shown in FIG. 12, there is a case where the parallel-to-serial conversion (P/S) process in the smoothing processing unit 60 is not in time for receiving the image data transmitted from the page memory 19 in the DMA transmission mode. In this case, the operations are carried out in accordance with a timing chart as shown in FIG. 24. In FIG. 24, (a)–(d) indicate the DMA cycle, and (f) and (g) respectively indicate the SIFTLD signal and the SIFTCK signal in which the phases thereof differ from the phase of the DMA cycle. When the phase of the DMA cycle differs from the phases of the SIFTLD and SIFTCK signals, the DMA transmission process is not carried out. When the phases become equal to each other at the next DMA cycle, the DMA transmission process restarts.

Figure 25:
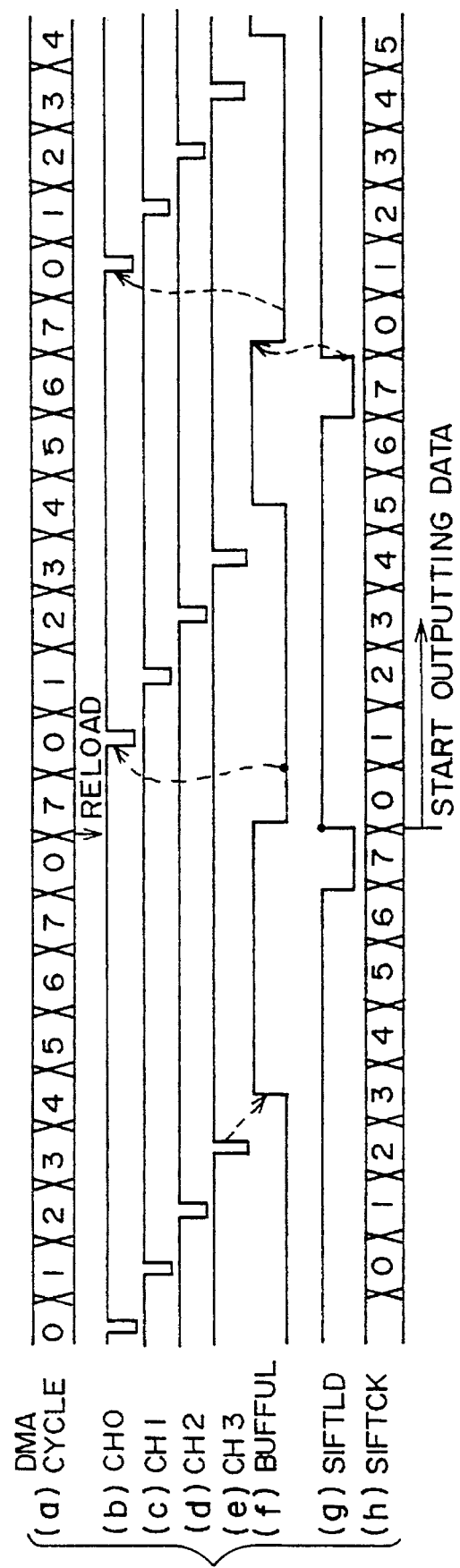
FIG. 25 is a timing chart illustrating states of various signals in a case where the DMA cycle is changed in the asynchronous state.

The DMA cycle is changed in accordance with a flow chart as shown in FIG. 25.

Referring to FIG. 25, at a time when the phases becomes different from each other (a point indicated by RELOAD in FIG. 25), the operation timing of DMA channels CH0 and CH 7 are inserted in the DMA cycle time. As a result, the image data can be successively transmitted in time for the output timing of the P/S registers 65–68. Thus, the priority of the DMA cycle can be changed in accordance with the scanning timing of the laser beam based on the rotation of the polygonal mirror 81.

As has been described above, the DMA transmission process for transmitting the image data from the host unit 11 to the page memory 19 and the DMA transmission process for transmitting the image data from the page memory 19 to the smoothing processing until 60 are successively executed by the DMAC unit 40. Thus, the memory space of the page memory 19 can be effectively used, the image data to be provided in the smoothing process can be transmitted in the DMA transmission mode without the slave CPU and the SRAM used for restructuring the addresses.

Figure 26:
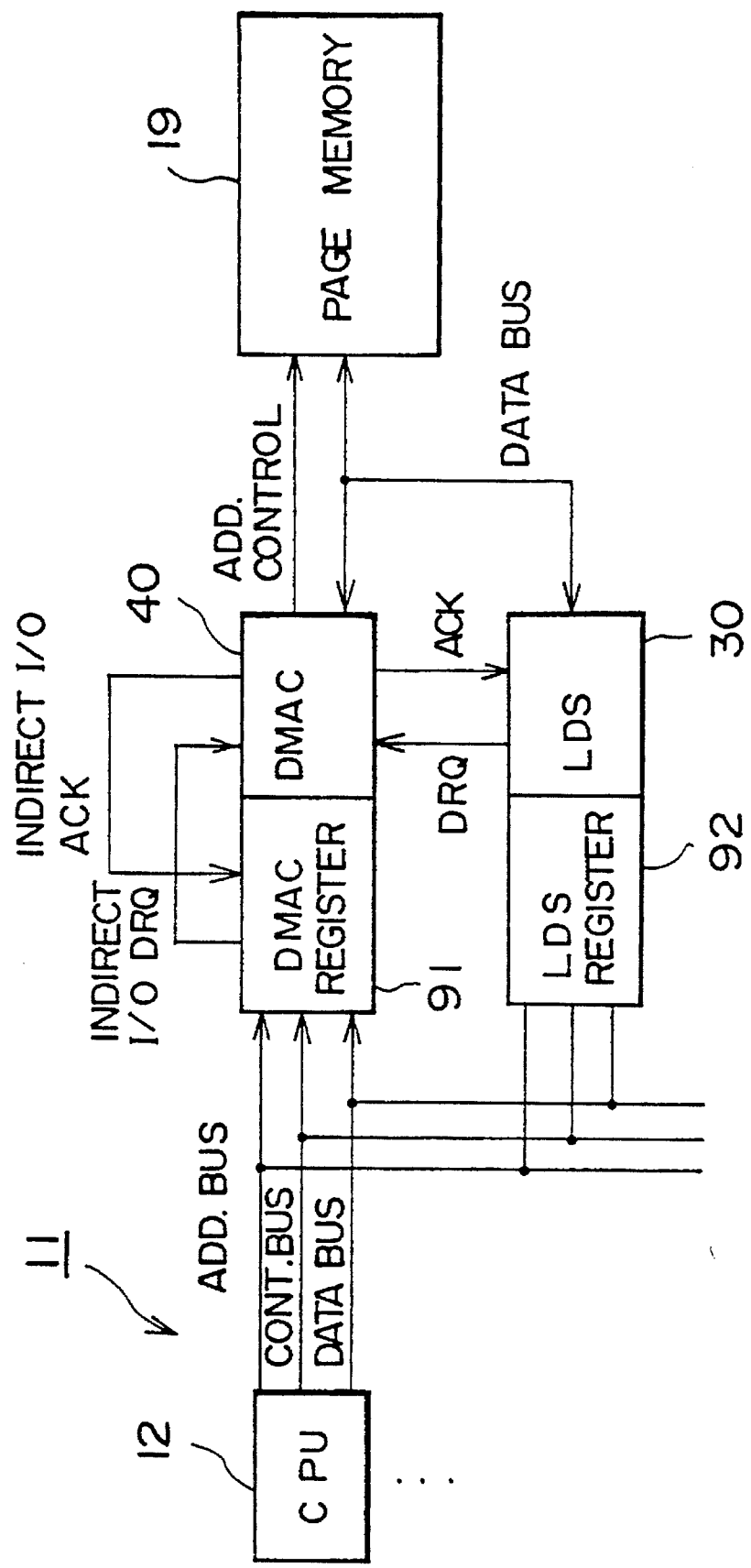
FIG. 26 is a block diagram illustrating an essential constitution of the data transmission processing system.

In the above embodiment, as the reference window is formed of the 3×4 matrix, four DMA data set ports 61–64 and four P/S register 65–68 so that image data for four lines is processed in one process. However, the number of lines to be processed in one process can be changed in accordance with the contents of the smoothing process. In addition, the data transmission processing system can be also applied to other image processing systems and data processing systems. FIG. 26 shows an essential constitution of the data transmission processing system shown in FIGS. 3–25, and an example of the mapping of peripheral devices on the bus is indicated in FIG. 26.

Referring to FIG. 26, the page memory 19 is mapped, as a peripheral device, on the DMA data transmission bus. The LDS unit 30, and other devices such as a scanner, a DCR unit for coding and decoding data, a communication unit (CCU) are also provided, as peripheral units, in this system. These devices are assigned to the data bus, so that the data can be transmitted at a high rate. However, as the control address of the LDS unit 30 is coupled to the interface (I/O) of the CPU 12 in the host unit 11, the peripheral units must be coupled to both the control bus and data bus of the DMAC 40. Thus, the number of data lines and the number of control lines will be increased, the area of the print circuit board (PCB) is expanded. In a case where the peripheral devices are formed in an LSI device, the number of pins of the LSI device are increased.

Thus, the LDS unit 30 and other peripheral devices are mapped on the bus of the DMAC unit 40 in the same manner as the page memory 19. The CPU 12 indirectly accesses the peripheral units via the DMAC unit 40, so that an increasing the number of lines is prevented. In FIG. 26, DMAC registers 91 are provided in the DMAC unit 40 as shown in FIG. 5. LDS registers 92 are provided in the LDS unit 30.

Figure 27:
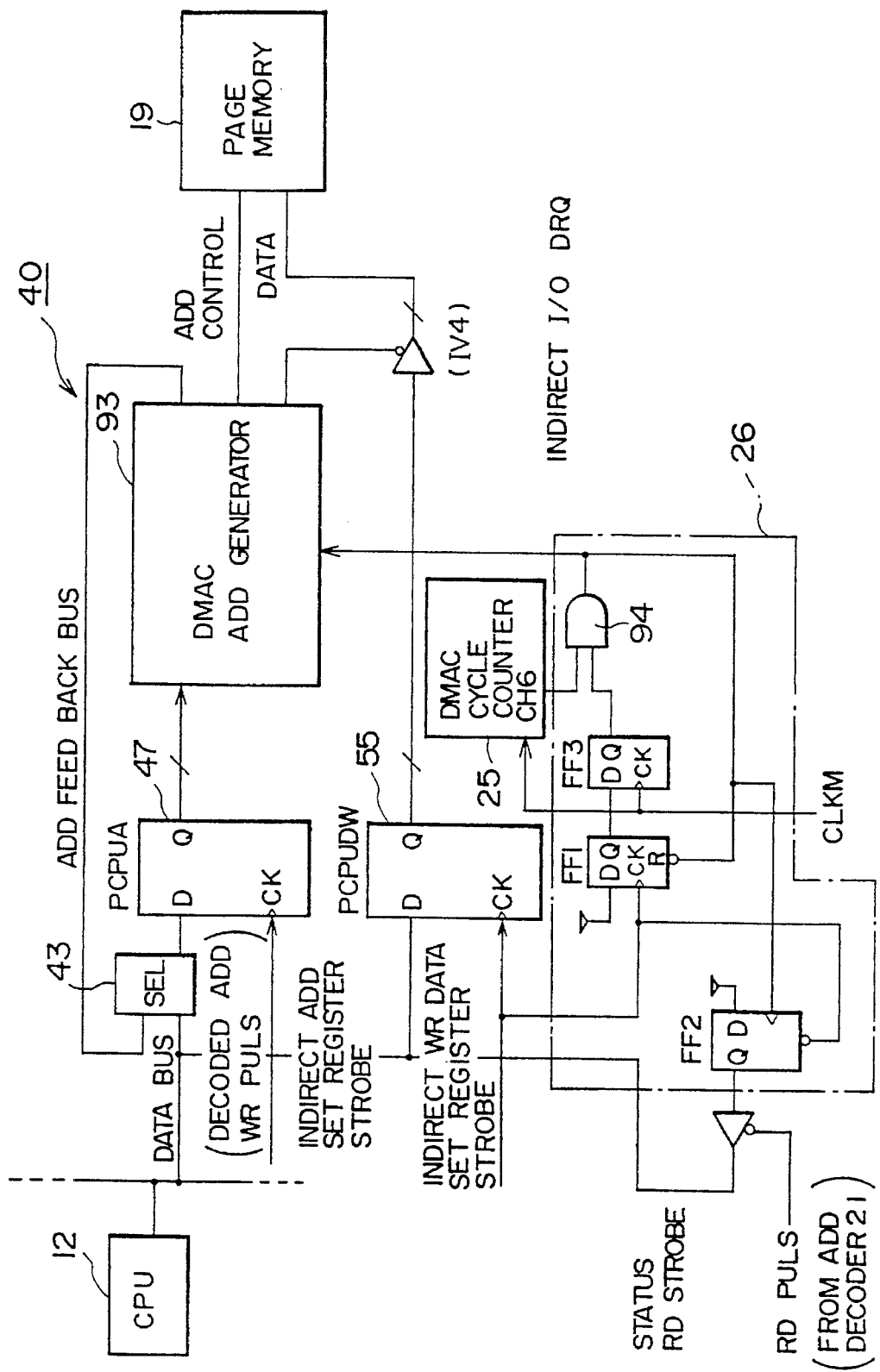
FIG. 27 is a block diagram illustrating a detailed structure of the DMAC unit shown in FIG. 26.
Figure 28:
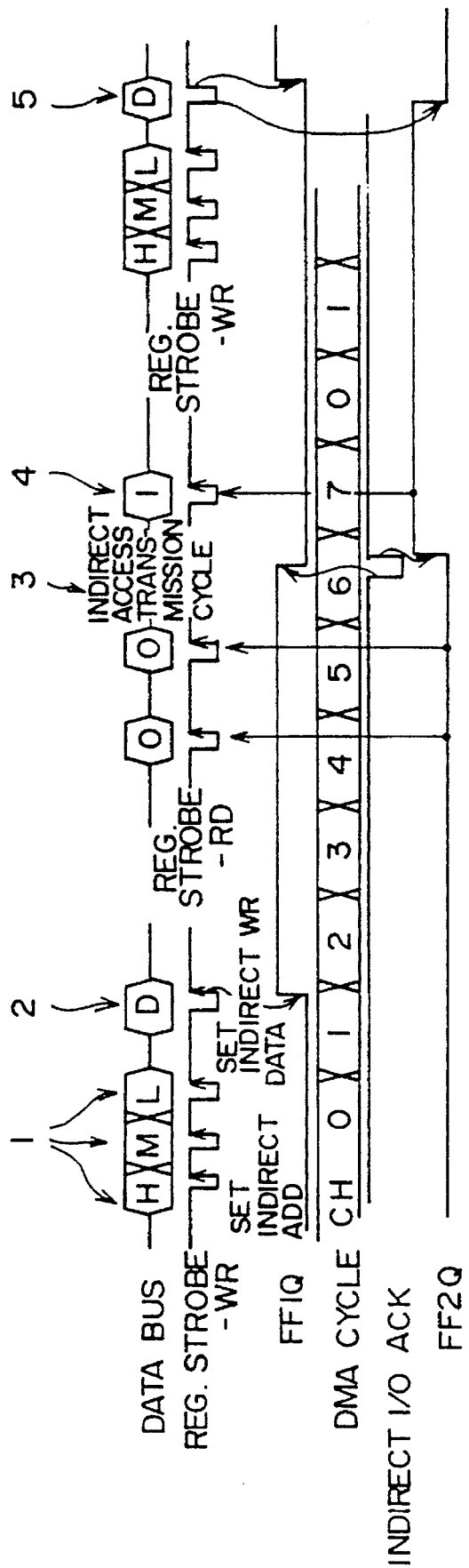
FIG. 28 is a timing chart illustrating an indirect accessing process.

The internal constitution of the DMAC unit 40 is shown in FIG. 27 and the indirect accessing operation is performed in accordance with a timing chart as shown in FIG. 28.

Referring to FIG. 27, a DMAC address generator unit 93 corresponds to a block indicated by a dotted line in FIG. 5. Data is written into an address specified by the CPU 12 in accordance with the operation timing of the DMA channel CH6. An address of the page memory 19 in which address image data is written in accordance with the indirect writing process is set in the PCPUA register 47. The PCPUA register 47 corresponds to a register used for setting a CPU access address to be supplied to the page memory 19, as shown in FIG. 5. As the page memory 19 has an area of about 2M bytes, the address is, for example, divided into three parts H, M and L and these parts H, M and L are successively set. Thus, three pulses of a strobe signal is supplied to the register to set the data therein, as shown by ① in FIG. 28. This strobe signal WR is output from the address decoder 21 shown in FIG. 3. The PCPUDW register 55 corresponds to a register used for set in write data to be supplied to the page memory 19. The data supplied from the CPU 12 via the data bus is directly set in the PCPUDW register 55. The data set strobe signal RD to be supplied to the PCPUDW register 55 is output after setting the indirect address, as shown by ① in FIG. 28. The data set strobe signal RD is output from the address decoder 21 shown in FIG. 3 in the same manner as the above write strobe signal WR.

The strobe signal RD is input to a flip-flop FF1 as shown in FIG. 27. The strobe signal RD is supplied to a gate 94 via the flip-flop FF1 and a flip-flop FF2. The output of the DMAC cycle counter 25 (corresponding to the DMA channel CH6) is also supplied to the gate 94. The gate 94 outputs a data request signal DREQ of the indirect I/O to the DMAC address generator unit 93. The DMAC address generator unit 93 makes the gate of the inverter IV4 to be turned on based on the data request signal DREQ, and the data set in the PCPUDW register 55 is written into the page memory 19. That is, in the process in the DAM channel CH6, the data set in the PCPUDW register 55 is written into the page memory 19 and the outputs Q of the flip-flops FF1 and FF2 respectively become a low level (L) and a high level (n).

Here, the flip-flop FF2 is a latch for monitoring a status of data writing process in the DMA channel CH6. The output Q of the flip-flop FF2 is supplied to the CPU 12 via the data bus based on a status register read strobe signal (a RD pulse) output from the address decoder 21 shown in FIG. 3. The CPU 12 monitors the output Q of the flip-flop FF2 at the output timing of the RD pulse, as shown in FIG. 28 and detects the state of the data writing process. That is, the CPU 12 monitors the output Q of the flip-flop FF2 from starting the indirect access process, and is being in a waiting state until the output Q of the flip-flop FF2 becomes "1", as shown by ④ in FIG. 28. Due to monitoring the output Q of the flip-flop FF2, the CPU 12 can recognize that a period of Q=0 is a period in which the next data shown by ⑤ in FIG. 28 should be inhibited from being set in the register. Then, when the strobe signal WR for setting the data shown by ⑤ in FIG. 28 becomes a low level, the flip-flop FF2 is reset, and when the strobe signal WR becomes a high level, the flip-flop FF2 is set so that the output Q becomes the high level. The flip-flops FF1 and FF2 and the gate 94 is included in the DMA request processing unit 26 shown in FIG. 3.

As has been described above, the CPU 12 ascertains whether or not the data obtained by the indirectly access process is normally transmitted to the page memory 19, and repeatedly transmits the data in accordance with the execution cycle of the DMA channels. Here, the DMA cycle and the CPU cycle are in asynchronous with each other. Thus, there may be a case where the DMAC unit 40 is in a waiting state until the CPU 12 ascertains that the output Q of the flip-flop FF2 is set. As a result, programs become complex.

Accordingly, a description will now be given of an example in which the CPU 12 is made to be in a HALT state so that the load of the software in the CPU 12 is decreased.

Figure 29:
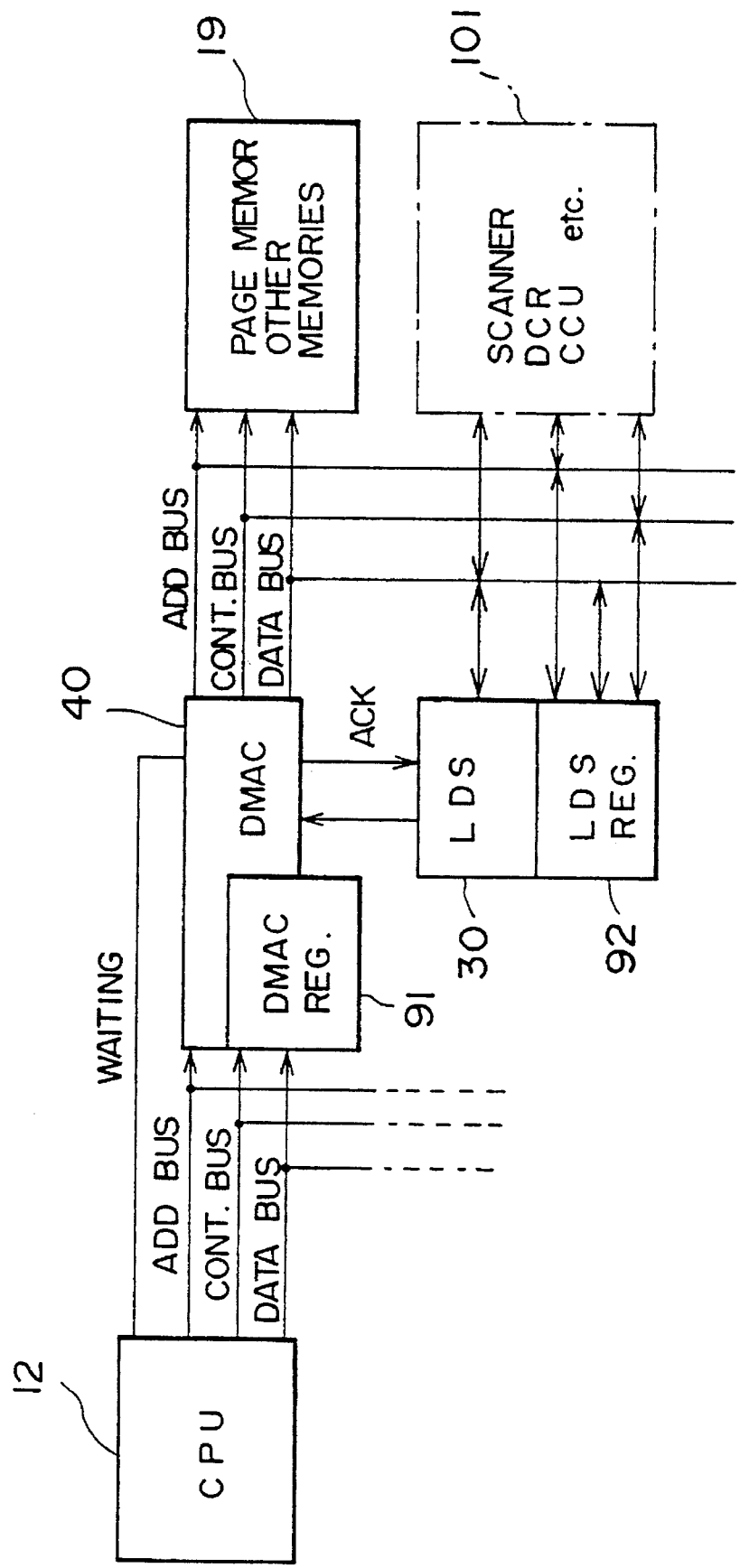
FIG. 29 is a block diagram illustrating a data transmission processing system according to another embodiment.

FIG. 29 shows another example of the data transmission processing system. In FIG. 29, those parts which are the same as those shown in FIGS. 26 and 27 are given the same reference numbers.

Referring to FIG. 29, the LDS unit 30 and peripheral devices 101 including the scanner, the DCR unit, the CCU and the like are mapped on the buss address in the same manner as the page memory 19. The DMA channel (e.g. CH6) for accessing the peripheral devices 101 based on instructions from the CPU 12 is provided in the DMAC unit 40. The DMAC register 91 corresponds to the registers shown in FIG. 5, and has an address storage portion and a data storage portion for respectively storing addresses and data based on instruction from the CPU 12. The DMAC unit 40 carries out the DMA transmission process. In this DMA transmission process, the data is transmitted between the peripheral devices 101 and the data storage portion of the DMAC register 91 in the execution cycle of the DMA channel CH6 in accordance with the addresses stored in the address storage portion of the DMAC register 91. While the DMAC unit 40 is operating, a wait signal (a halt instruction) supplied from the DMAC unit 40 to the CPU 12 is being activated from the starting of the access to the peripheral devices 101 to the termination of the access thereto.

Figure 30:
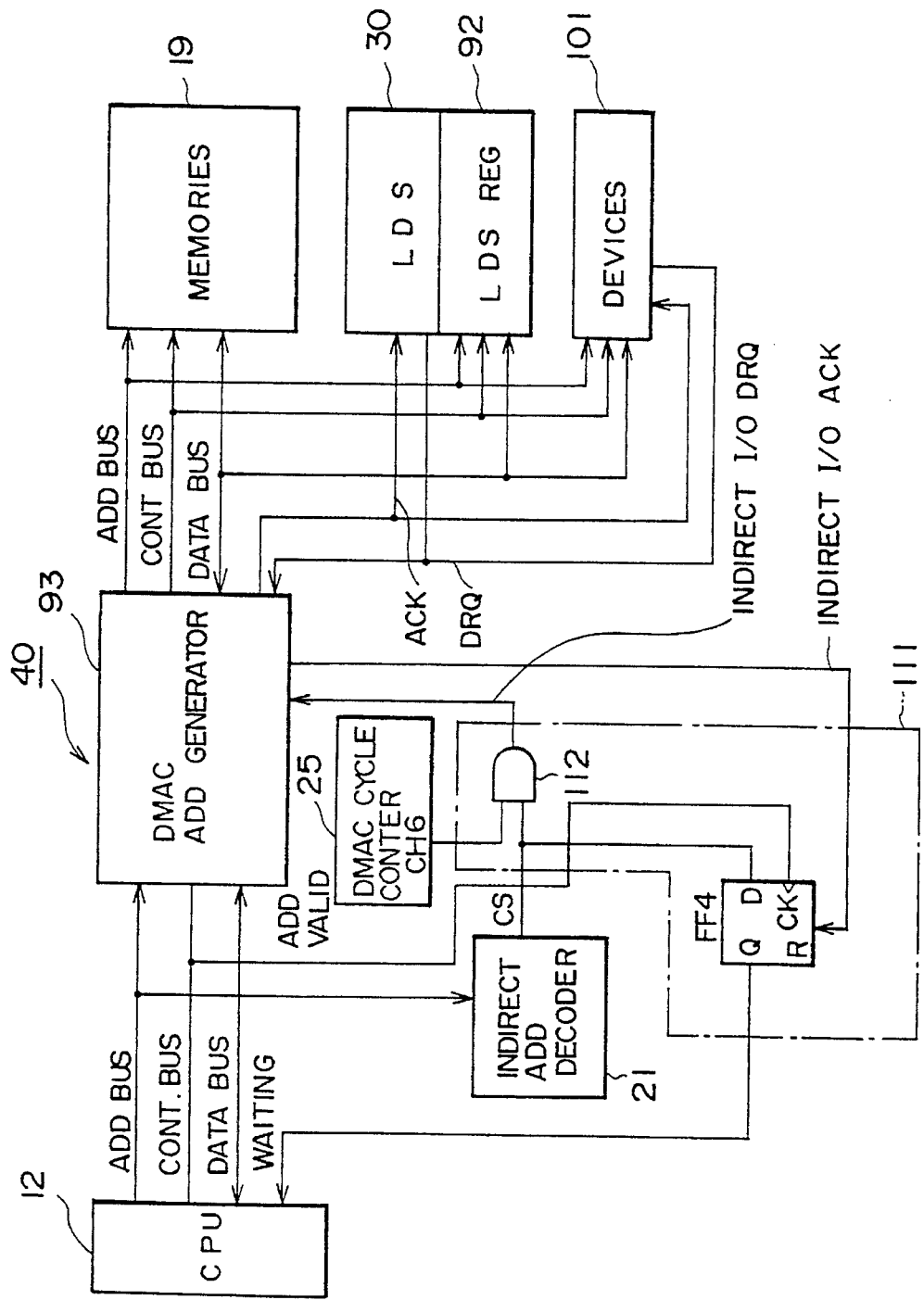
FIG. 30 is a block diagram illustrating a wait signal generator unit shown in FIG. 29.

The wait signal generator unit is shown, as a temporary termination controller 111, in FIG. 30. In the temporary termination controller 111, a gate 112 outputs a chip-select signal (CS) supplied from the indirect address decoder 21 in the execution cycle of the DMA channel CH6 specified by the DMAC cycle counter 25. The chip-select signal is used as the data request signal DREQ of the indirect I/O. A flip-flop FF4 latches and outputs the chip-select signal. The output Q of the flip-flop FF4 functions as the wait signal for halting the CPU 12.

In the above embodiment as shown in FIG. 29, the peripheral devices 101 and the LDS unit 30 are connected to the bus of the DMAC unit 40 in the same manner as the page memory 19. Thus, in the previous embodiment as shown in FIGS. 26, 27 and 28, the LDS register 92 is connected to the I/O of the CPU 12, but in this embodiment, the LDS register 92 is connected to the bus of the DMAC unit 40. A memory used as a buffer of the DMA transmission can be also coupled to the bus of the DMAC unit 40. The peripheral devices 101, the page memory 19 and the LDS unit 30 are not directly accessed by the CPU 12. However, the CPU 12 can indirectly accesses the peripheral devices 101, the page memory 19 and the LDS unit 30 by use of the DMA channels sequentially switched.

According to the above embodiment, it is unnecessary to provide a bus extending from the CPU 12 to the peripheral devices, and only the bus of the DMAC unit 40 is needed. Thus, the print circuit board on which the present data transmission processing system is mounted can be miniaturized, and the number of pins of the LSI in which the present data transmission processing system is formed can be decreased.

In the above embodiment as shown in FIG. 30, the temporary termination controller 111 halts the processes executed in the CPU 12 while the DMAC unit 40 is operating. When the CPU 12 outputs the address of the page memory 19 to be accessed, the operation in the DMAC unit 40 is triggered. The address is decoded into an address identifying a peripheral device connected to the bus of the DMAC unit 40 by the indirect address decoder 21. The decoded address is supplied, as the chip-select signal, to the gate 112. The gate 112 supplies the decoded address, as the data request signal DREQ, to the DMAC address generator unit 93 in synchronism with the execution cycle of the DMA channel CH6. The chip-select signal (the decoded address)

is supplied to the flip-flop FF4, and the output Q of the flip-flop FF4 is supplied, as the wait signal, to the CPU 12. When receiving the wait signal, the CPU 12 is in a halt state.

The detailed description of the process will be described with reference to a timing chart shown in FIG. 31 bellow.

Figures 31A, 31B:
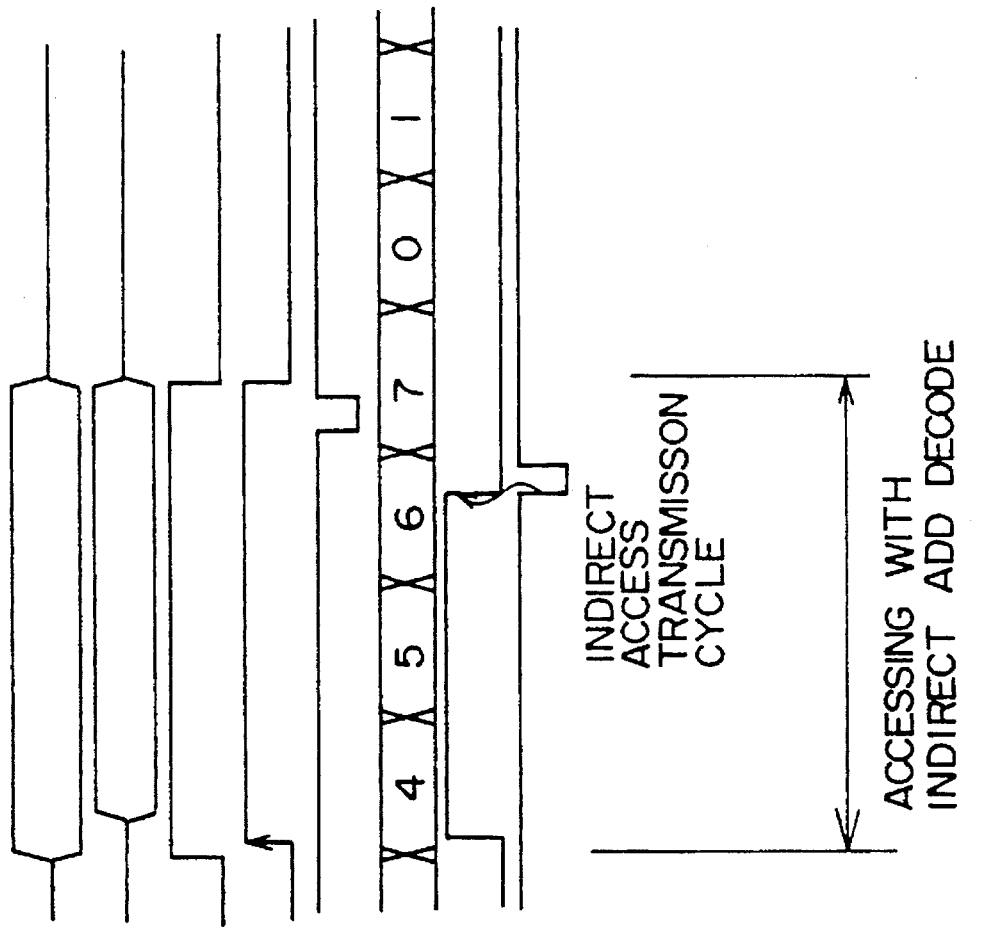
FIG. 31 is a timing chart illustrating a direct accessing process and an indirect accessing process.

In a case where CPU 12 directly accesses the peripheral devices, the CPU 12 normally outputs an address and data, and the WR strobe signal is generated by the CPU 12, as shown in FIG. 31(a). In this case, the wait signal is not supplied to the CPU 12. On the other hand, in the indirect accessing process as shown in FIG. 31(b), the CPU 12 supplies an address to be accessed to the indirect address decoder 21. When receiving the address, the indirect address decoder 21 outputs the chip select signal. When the chip select signal and a address valid signal used for accessing the page memory are input to the flip-flop FF4, the wait signal is output from the flip-flop FF4 (Q). The CPU 12 is in the wait state (the halt state) caused by the wait signal. When the DMA cycle counter 25 reaches a value corresponding to the DMA channel CH6, the data request signal DREQ of the indirect I/O is output from the gate 112. At this time, the address and the data have been latched in the DMAC register 91 shown in FIG. 29, the address and the data are provided to the DMA bus in the indirect access transmission cycle of the DMAC unit 40. The DMAC address generator unit 93 outputs strobe signals (response signal ACK of the indirect I/O) to be supplied to the peripheral devices in the indirect access transmission cycle, and then the access to the peripheral devices is completed. The flip-flop FF4 is reset by the strobe signal, so that the wait signal is inactivated. Due to the inactivation of the wait signal, the CPU 12 restarts the operations.

The image data is written into the page memory 19 as follows.

The DMAC unit 40 supplies the wait signal to the CPU 12, and the operation in the CPU 12 is terminated. At the start timing of the process in the DMA channel CH6, the data request signal DREQ for the DMA channel CH6 is supplied to the DMAC unit 40. Due to the data request signal DREQ, effective data on the bus of the CPU 12 is supplied to the DMA bus of the DMAC unit 40 as it is at the operation timing of the DMA channel CH6, the data is written into the page memory 19 due to the response signal ACK output from the DMAC unit 40 to the I/O.

In the read cycle, the process is carried out in the same manner as in the write cycle as described above.

The DMAC unit 40 detects the read address specified by the CPU 12. The DMAC unit 40 supplies to the wait signal to the CPU 12 so that the CPU 12 is in the HALT state, in the same manner as in the above write operation. Then, the DMAC unit 40 is waiting for receiving the data request signal DREQ of the DMAC channel CH6. When the DMA channel CH6 is activated, effective data (read data) provided to the DMA bus caused by the data strobe signal RD from the DMAC unit 40 is stored into a latch (the data storage portion in the DMAC register 91 shown in FIG. 29) in the bus controller. After the DMA cycle is completed and latched data is fixed, the CPU 12 resumes the operations and reads the latched data.

In the above embodiment, the DMA transmission channels used for the indirect access based on the instruction from the CPU 12 are allocated to the peripherally units including the LDS unit 30 and the page memory 19. During the DMA transmission process, the wait signal is supplied to the CPU 12 which has output the data transmission request so that the CPU 12 is temporarily in the HALT state. Thus, even if there is no wait cycle in the software provided in the CPU 12 (see ④ in FIG. 28), the CPU can be restored immediately after the DMA transmission process is completed. The CPU 12 does not recognize that itself is in the wait state, so that the CPU 12 may be provided with the program for the normal direct accessing process. Thus, the amount of load for the waiting process can be decreased in the software.

A description will now be given of another embodiment of the present invention. When the DMA cycle is carried out at a high speed, a case in which the access of a peripheral device is not in time for a corresponding DMA cycle can occur. Thus, it can be proposed that a wait cycle is inserted in the DMA transmission process. In this embodiment, a wait cycle corresponding to a response speed of each peripheral device is determined in a corresponding DMA channel, so that the reduction of the process speed in each DMA transmission process can be minimized.

Figure 32:
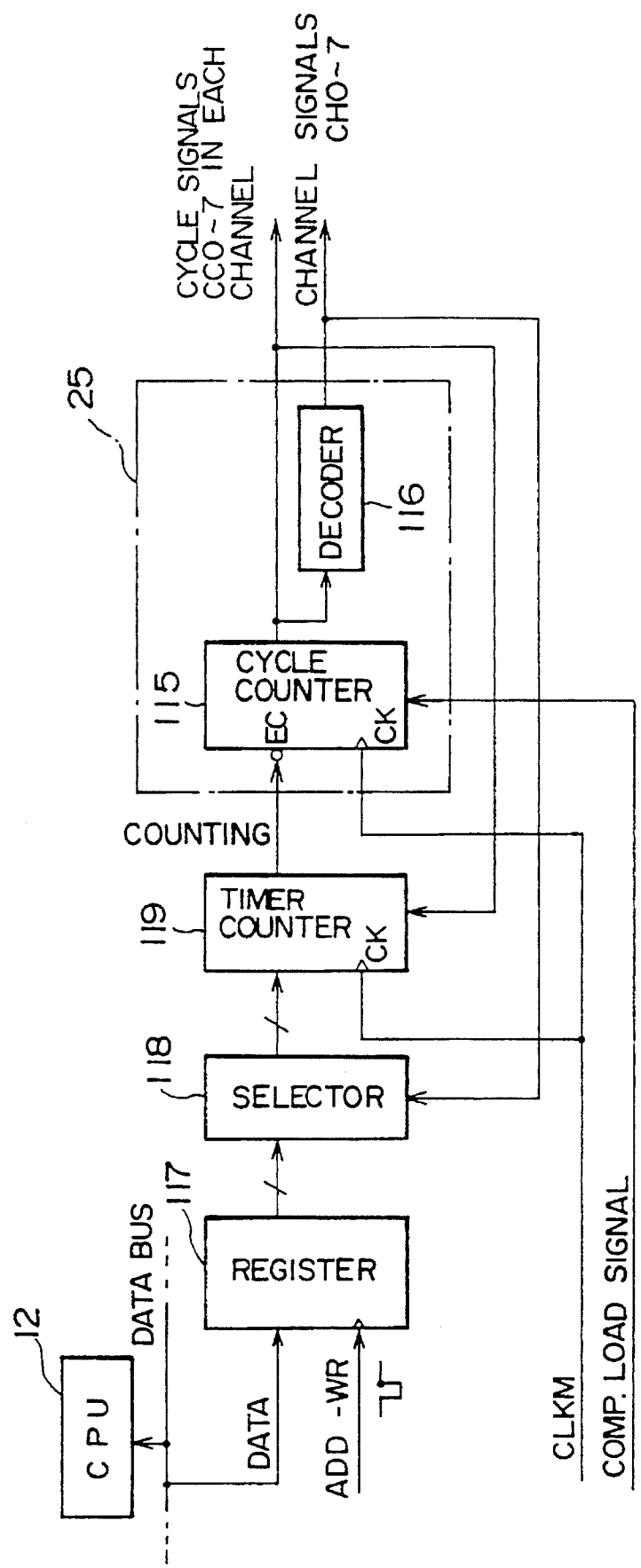
FIG. 32 is a block diagram illustrating a data transmission processing system according to another embodiment.

FIG. 32 shows the essential constitution of the data transmission processing system according to the embodiment of the present invention. FIG. 33 is a timing chart illustrating operations in the data transmission processing system shown in FIG. 32.

Referring to FIG. 32, the DMA cycle counter 25 has a cycle counter 115 performing an up-counting in synchronism with the main clock signal CLKM. The cycle counter 115 outputs, a cycle signal CC, count values "0" to "7". When the cycle signal reaches "7", the cycle counter 115 is reset by a compulsive load signal. The DMA cycle counter 25 also has a decoder 116. The decoder 116 recognizes that the values "0" to "7" of the cycle signal CC correspond to an execution cycle of one DMA channel, and outputs channel signals CH "0" to "7". That is, every time the cycle signal CC is incremented by seven counts, the channel signal CH is switched. A wait setting register 117 is coupled to the CPU 12 via the data bus, waiting times (waiting cycle numbers) for respective DMA channels are stored in the wait setting register 117. A selector 118 selects one of the waiting cycle numbers stored in the wait setting register 117. A timer counter 119 carries out a counting operation until the count value reaches the waiting cycle number selected by the selector 118. The timer counter 119 activates a count waiting signal while the timer counter 119 is carrying out the counting operation. The count waiting signal is supplied to a count enable terminal ($\overline{EC}$) of the cycle counter 115. Thus, while the count waiting signal is being activated, the cycle counter 115 discontinues the counting the up-counting operation. The cycle counter 115 normally outputs, for example, the cycle signal CC5 by one counting operation as shown in ① of FIG. 33. However, when the waiting count signal is being activated under a condition in which the cycle count signal CC5 is output from the cycle counter 115, the cycle count signal CC5 are maintained by tow or one counting operation, as shown in ② or ③ of FIG. 33. As a result, the execution cycle times of the DMA channels CH1 and CH2 are extended as shown in FIG. 33.

It is assumed that the DMA channels CH0, CH1 and CH2 are respectively used for reading data from different memories (DRAM) coupled to the DMA bus. The waiting cycle numbers for respective DMA channels are written into the wait setting register 117 by the CPU 12. In a case where each waiting cycle number is represented by 2 bits and there are 8 DMA channels, a 2-byte register is used as the wait setting register 117 The wait cycle numbers "0", "1" and "2" respectively corresponding to the DMA channels CH0, CH1 and CH2 are, for example, set in the wait setting register 117. When the outputs corresponding to the DMA channels CH0–CH2 are successively supplied to the selector 118, the selector 118 successively selects the waiting cycle numbers corresponding the the next DMA channels CH1–CH3. Each of the waiting cycle numbers is loaded into the timer counter 119. While the timer counter 119 is carrying out the counting operation, the cycle counter 115 discontinues the up-counting operation. Thus, the cycle time for each DMA channel can be controlled. In this embodiment, the up-counting operation of the cycle counter 115 is discontinued so that the channel signal CC5 is maintained for a predetermined time. The cycle counter 115 can be also controlled so that other channel signals are maintained for a predetermined time.

The timing at which the effective data is obtained can be estimated based on a period for which the count waiting signal should be activated and the DMA channel in which the cycle time should be extended, as shown in T1, T2 and T3 of FIG. 33. Thus, even if the peripheral device is operated in a low speed, due to extension of the cycle time of the DMA channel corresponding to the peripheral device, the DMA transmission process can be performed with certainty.

The present invention is not limited to the aforementioned embodiments, and variations and modifications may be made without departing from the scope of the claimed invention.

What is claimed is:

1. A data transmission processing system provided between a host unit and peripheral devices including at least a memory device for storing data supplied from said host unit and a processing device for processing the data stored in said memory device in accordance with a predetermined algorithm, said host unit outputting, to said data transmission processing system, DMA transmission process request commands for requesting DMA (Direct Memory Access) transmission processes in which data is transmitted to said peripheral devices in a DMA transmission mode, said data transmission processing system comprising:

DMA control means, provided with a plurality of DMA channels, for cyclically selecting a DMA channel from said plurality of DMA channels in accordance with a predetermined priority, said plurality of DMA channels being assigned to processes for said peripheral devices;

DMA execution means, coupled to said DMA control means, for carrying out a DMA transmission process for transmitting data output from said host unit, in data transmission timing of said host unit, to said memory device using DMA channels which are selected for said memory device and a DMA transmission process for transmitting data stored in said memory device to said processing device using DMA channels which are selected for said processing device, in accordance with the DMA transmission process request commands supplied from said host unit; and wherein timing of the DMA transmission process performed by said DMA executing means differ from timing of the process performed by said processing device, and wherein said data transmission processing system further comprising priority changing means for changing the priority in accordance with which the DMA channel is selected so that DMA transmission process is carried out in synchronism with the process performed in said processing device, whereby the timing of the DMA transmission processes for transmitting the data from said host unit to said memory device and from said memory device to said processing device is based on the timing of the process performed in said processing device, so that the DMA transmission processes in which the data is transmitted from said host unit to said memory device and from said memory device to said processing unit are successively carried out.

2. A data transmission processing system as claimed in claim 1, wherein said memory device is formed of a DRAM (Dynamic Random Access Memory), and wherein a refreshing process for refreshing said DRAM is allocated to one of said DMA channels, so that control information is supplied to said DRAM via the DMA channel to which said refreshing process is allocated.

3. A data transmission processing system as claimed in claim 1, wherein said host unit outputs image data, wherein said memory device is a page memory for storing image data for one page, and said processing device processes the image data stored in said page memory, and wherein a process for transmitting the image data from said memory device to said processing device is allocated to at least one of said plurality of DMA channels.

4. A data transmission processing process as claimed in claim 3, wherein the process for transmitting the image data from said page memory to said processing device is allocated to a plurality of said plurality of DMA channels.

5. A data transmission processing system as claimed in claim 1, wherein said host unit has limit value storage means for storing an upper limit value corresponding to a maximum amount of data storage in said memory device, and wherein said data transmission processing system further comprising:

detecting means for detecting whether or not an amount of data to be transmitted from the host unit to said memory device by said DMA execution means has reached the upper limit value stored in said limit value storage means; and write control means, coupled to said detecting means, for changing an address, to which address the data should be transmitted via a DMA channel selected by said DMA control means, to a predetermined initial address when said detecting means detects that the amount of data to be transmitted from the host unit to said memory device has reached the upper limit value.

6. A data transmission processing system as claimed in claim 1, wherein said host unit has limit value storage means for storing an upper limit value corresponding to a maximum amount of data storage in said memory device, and wherein said data transmission processing system further comprises:

reference storage means for storing an address value corresponding to an amount of data which has been transmitted to and stored in said memory device in the previous DMA transmission process, the address value stored in said reference storage means being defined as a reference address value;

address adding means, coupled to said reference storage means, for adding the reference address value stored in said reference storage means to an address value corresponding to an amount of data which is transmitted to and stored in said memory device in a new DMA transmission process to form an adding result;

determination means for determining whether or not the adding result obtained by said address adding means has reached the upper limit value stored in said limit value storage means;

address calculation means for adding "+1" to an initial address value of the data which has been transmitted to and stored in said memory device when said determination means determines that the adding result has reached the upper limit, a result obtained by said address calculation means being supplied, as the reference address, to said address adding means, wherein the address into which the data should be stored is determined based on the adding result obtained by said address adding means and the DMA transmission process for transmitting the data from said memory device to said processing device is performed based on the adding result.

7. A data transmission processing system, as claimed in claim 1, further comprising:

address storage means for storing addresses based on an instruction supplied from said host unit; and data storage means for storing data based on the instruction supplied from said host unit, so that the data in transmitted between said data storage means and said peripheral devices with reference to the addresses stored in said address storage means via the DMA channels corresponding to said peripheral devices.

8. A data transmission processing system as claimed in claim 7, further comprising:

means for activating a halt instruction used for temporarily stopping a control process in said host unit from a time when said peripheral devices are accessed based on an instruction from said host unit until the DMA transmission process is completed.

9. A data transmission processing system as claimed in claim 8, further comprising:

waiting time storage means for storing a waiting time corresponding to each of the DMA channels;

waiting time selecting means for selecting a corresponding waiting time stored in said waiting time storage means in accordance with operation timing of the selected DMA channel; and delay means for delaying the operation timing of the selected DMA channel by the waiting time selected by said waiting time selecting means.

* * * * *